(12) United States Patent
Lopez

(10) Patent No.: US 9,762,746 B2
(45) Date of Patent: Sep. 12, 2017

(54) ADVICE OF CHARGE IN CONTENT CENTRIC NETWORKS

(71) Applicant: Telefonaktiebolaget L M Ericsson (publ), Stockholm (SE)

(72) Inventor: Carlos Valencia Lopez, Madrid (ES)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 249 days.

(21) Appl. No.: 14/600,788

(22) Filed: Jan. 20, 2015

(65) Prior Publication Data
US 2016/0212277 A1  Jul. 21, 2016

(51) Int. Cl.
*H04M 15/00* (2006.01)
*H04L 12/14* (2006.01)

(52) U.S. Cl.
CPC ...... *H04M 15/835* (2013.01); *H04L 12/1417* (2013.01); *H04M 15/66* (2013.01); *H04M 2215/82* (2013.01)

(58) Field of Classification Search
CPC ........... H04M 15/835; H04M 2215/82; H04M 15/66; H04M 15/82; H04M 15/48
See application file for complete search history.

(56) References Cited

U.S. PATENT DOCUMENTS

| 2004/0052225 A1* | 3/2004 | Lundstrom | H04L 12/14 370/329 |
|---|---|---|---|
| 2009/0288163 A1* | 11/2009 | Jacobson | G06F 15/173 726/22 |
| 2010/0125511 A1* | 5/2010 | Jouret | G06F 21/10 705/26.1 |
| 2012/0143770 A1* | 6/2012 | Pauker | G06Q 20/02 705/71 |
| 2014/0181226 A1* | 6/2014 | Xu | H04L 51/14 709/206 |

(Continued)

OTHER PUBLICATIONS

Jacobson, Van, "A Description of Content-Centric Networking (CCN)", Jul. 22, 2009, https://named-data.net/wp-content/uploads/2014/04/van-ccn-bremen-description.pdf, Special Invited Plenary Short Course, pp. 35.*

(Continued)

*Primary Examiner* — Jeffrey M Rutkowski
*Assistant Examiner* — Shah Rahman
(74) *Attorney, Agent, or Firm* — Nicholson De Vos Webster & Elliott, LLP

(57) ABSTRACT

Advice of charge (AoC) enforcement is implemented in a content centric networking (CCN) gateway. The AoC enforcement receives a CCN interest packet from a user equipment in a network external to the CCN network and looks up a prefix of the CCN name in an AoC table. The AoC enforcement further, in response to determining a match between the prefix of the CCN name and an entry in the AoC table, generates an AoC request and forwarding the AoC request toward an AoC server identified by the entry in the AoC table determined to be the match with the prefix of the CCN name. In response to not determining the match between the prefix of the CCN name and the entry in the AoC table or in response to receiving a purchase accepted response from the AoC server, a CCN object identified by the CCN name is retrieved and forwarded to the user equipment.

24 Claims, 12 Drawing Sheets

(56) References Cited

U.S. PATENT DOCUMENTS

| | | | | |
|---|---|---|---|---|
| 2015/0039681 A1* | 2/2015 | Gupta | ............... | H04L 67/2857 709/203 |
| 2015/0117253 A1* | 4/2015 | Scott | ............... | H04L 45/306 370/254 |
| 2015/0117453 A1* | 4/2015 | Mosko | ............... | H04L 45/7457 370/392 |
| 2015/0296028 A1* | 10/2015 | Scott | ............... | H04L 67/16 709/217 |
| 2015/0341329 A1* | 11/2015 | Mosko | ............... | H04L 63/08 726/3 |
| 2016/0050068 A1* | 2/2016 | Mahadevan | ............... | H04L 9/321 713/155 |
| 2016/0105524 A1* | 4/2016 | Farhadi | ............... | H04L 67/2842 370/412 |

OTHER PUBLICATIONS

"CCNx (Pre 1.0) Access Control Specifications", PARC; Jun. 30, 2010/ 24 pages.
"CCNx 1.0 Protocol Specification Roadmap", PARC; Apr. 14, 2014; 4 pages.
"Transmission Control Protocol; DARPA Internet Program; Protocol Specification", RFC 793; Sep. 1981; 85 pages.
Ali, Z. , et al., "Node-IDS Based Resource Reservation Protocol (RSVP) Hello: A Clarification Statement", Network Working Group; RFC 4558, The Internet Society, (Jun. 2006), 7 pages.
Andersson, L. , et al., "LDP Specification", Network Working Group; RFC 5036; Oct. 2007; 135 pages.
Awduche, D. , et al., ""RSVP-TE: Extensions to RSVP for LSP Tunnels,"", Network Working Group; RFC 3209; Dec. 2001; 61 pages.
Babiarz, J. , et al., "Configuration Guidelines for DiffServ Service Classes", Network Working Group; RFC 4594; Aug. 2006; 57 pages.
Baker, F. , et al., "A Differentiated Services Code Point (DSCP) for Capacity-Admitted Traffic", Internet Engineering Task Force (IETF); RFC 5865; May 2010; 14 pages.
Baker, F. , et al., "Management Information Base for the Differentiated Services Architecture", Network Working Group; RFC 3289; May 2002; 107 pages.
Berger, et al., "Generalized Multi-Protocol Label Switching (GMPLS) Signaling", RFC3473.txt, IETF Standard, Internet Engineering Task Force, IETF, CH, Jan. 2003, XP015009256; ISSN: 0000-0003, the whole document, 44 pages.
Bernet, Y. , et al., "An Informal Management Model for Diffserv Routers", Network Working Group; RFC 3290; May 2002; 56 pages.
Black, D. , "Differentiated Services and Tunnels", Network Working Group; RFC 2983; Oct. 2000; 14 pages.
Black, D. , et al., "Per Hop Behavior Identification Codes", Network Working Group, Jun. 2001, Standards Track, RFC 3140, pp. 1-8.
Blake, S. , et al., "An Architecture for Differentiated Services", Network Working Group; RFC 2475; Dec. 1998; 36 pages.
Borman, D. , et al., "IPv6 Jumbograms", Network Working Group; RFC 2675; Aug. 1999; 9 pages, Copyright The Internet Society 1999.
Braden, R. , et al., ""Resource ReSerVation Protocol (RSVP)—Version 1 Functional Specification,"", Network Working Group, RFC 2205; Sep. 2007; 112 pages.
Chan, K. , et al., "Differentiated Services Quality of Service Policy Information Base", Network Working Group; RFC 3317; Mar. 2003; 96 pages.

Charny, A. , et al., "Supplemental Information for the New Definition of the EF PHB (Expedited Forwarding Per-Hop Behavior)", Network Working Group; RFC 3247; Mar. 2002; 24 pages.
Coltun, R. , et al., "OSPF for IPv6", Network Working Group; RFC 5340; Jul. 2008; 60 pages.
Davie, B. , et al., "An Expedited Forwarding PHB (Per-Hop Behavior)", The Internet Society, Mar. 2002, RFC 3246, pp. 1-15.
Deering, et al., "Internet Protocol", IETF RFC 2460, version 6 (IPv6) Specification, Dec. 1998, 37 pages, http://www.ietf.org/rfc/rfc2460.txt.
Eggert, L. , et al., "Unicast UDP Usage guidelines for Application Designers", Network Working Group; RFC 5405; Nov. 2008; 27 pages.
Fenner, B. , et al., "Management Information Base for the User Datagram Protocol (UDP)", Network Working Group; RFC 4113; Jun. 2005; 19 pages.
Grossman, D. , "New Terminology and Clarifications for Diffserv", Network Working Group; RFC 3260; Apr. 2002; 10 pages.
Hedrick, C. , "Routing Information Protocol", Network Working Group; RFC 1058; Jun. 1988; 33 pages.
Heinanen, J. , et al., "Assured Forwarding PHB Group", The Internet Society, RFC 2597, (Jun. 1999), 11 pages.
Housley, R. , et al., "Using Advanced Encryption Standard (AES) CCM Mode with IPsec Encapsulating Security Payload (ESP)", Network Working Group; RFC 4309; Dec. 2005; 13 pages.
Kent, S. , et al., ""Security Architecture for the Internet Protocol",", RFC 4301, Dec. 2005.
Kompella, K. , et al., "Procedures for Modifying the Resource reSerVation Protocol (RSVP)", Network Working Group; RFC 3936, The Internet Society, (Oct. 2004), 7 pages.
Malkin, G. , et al., "RIP Version 2", Network Working Group; RFC 2453; Nov. 1998; 39 pages.
Malkin, G. , et al., "RIPng for IPv6", Network Working Group; RFC 2080, (Jan. 1997), 19 pages.
Moy, J , "OSPF Version 2", RFC 2328, Network Working Group, Apr. 1998, 204 pages.
Nichols, K. , et al., "Definition of Differentiated Services Per Domain Behaviors and Rules for their Specification", Network Working Group; RFC 3086; Apr. 2001; 24 pages.
Nichols, K. , et al., "Definition of the Differentiated Services Field (DS Field) in the IPvd and IPv6 Headers", The Internet Society, Dec. 1998, RFC 2474, pp. 1-19.
Oran, D. , "RFC 1142 OSI IS-IS Intra-Domain Routing Protocol", Digital Equipment Corp. Feb. 1990, http://www.faqs.org/rfcs/rfc1142.html., Oct. 19, 2011.
Polk, J. , et al., "A Resource Reservation Protocol (RSVP) Extension for the Reduction of Bandwidth of a Reservation Flow", Network Working Group; RFC 4495, The Internet Society, (May 2006), 21 pages.
Postel, J. , ""User Datagram Protocol",", Aug. 28, 1980, 3 pages, RFC 768.
Rekhter, Y. , et al., ""A Border Gateway Protocol 4 (BGP-4)",", RFC 4271, Jan. 2006.
Rosen, et al., Network Working Group; RFC 4364; ;BGP/MPLS IP Virtual Private Networks (VPNs),' copyright The Internet Society (2006); Feb. 2006; 47pgs.
Shenker, S. , et al., "Specification of Guaranteed Quality of Services", Network Working Group; RFC 2212, (Sep. 1997), 20 pages.
Wroclawski, J. , "Specification of the Controlled-Load Network Element Service", Network Working Group; RFC 2211; Sep. 1997; 19 pages.
Wroclawski, J. , "The Use of RSVP with IETF Integrated Services", Network Working Group; RFC 2210; Sep. 1997; 33 pages.

* cited by examiner

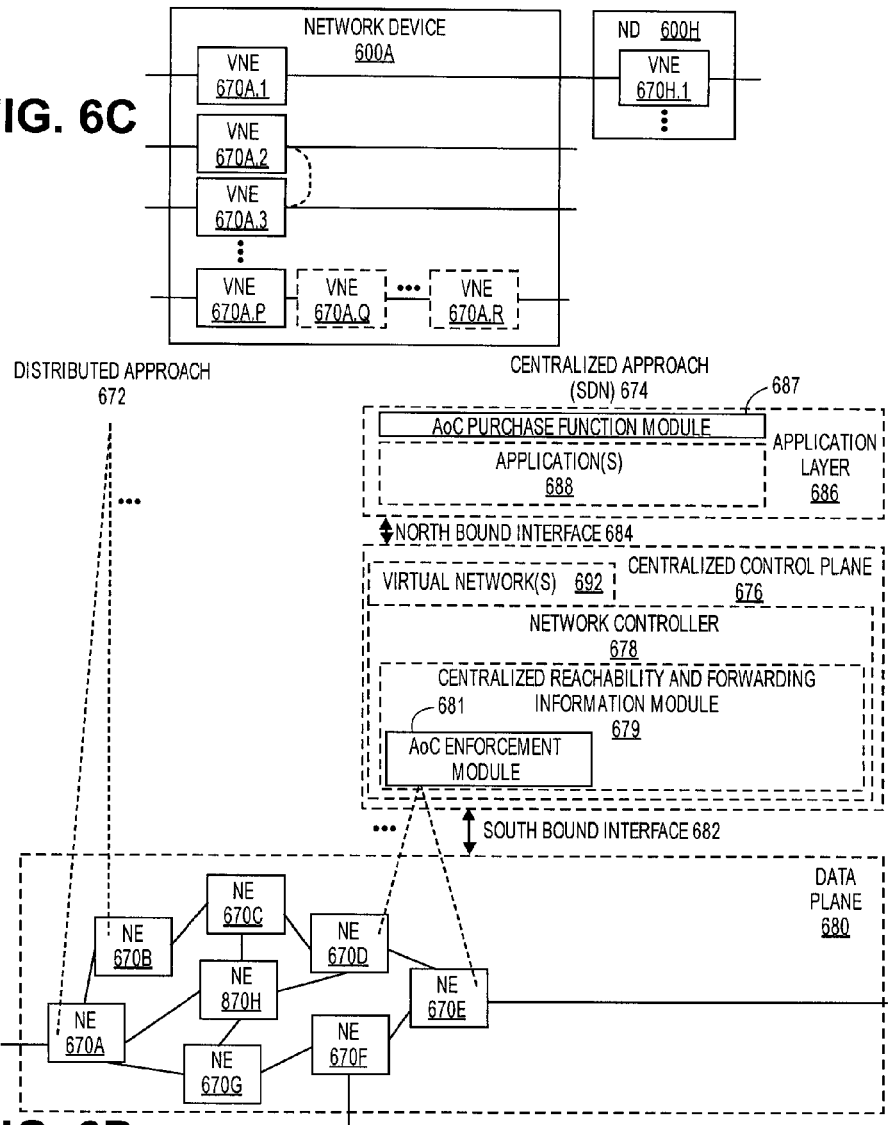
FIG. 6C
FIG. 6D
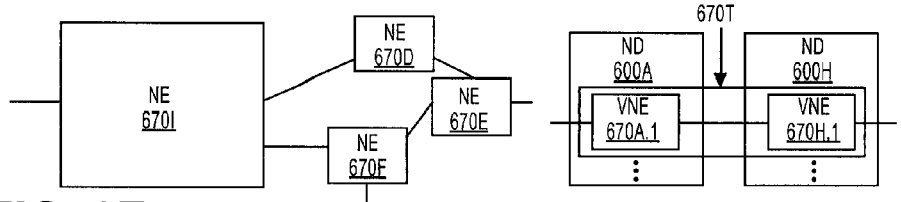
FIG. 6E
FIG. 6F

ADVICE OF CHARGE IN CONTENT CENTRIC NETWORKS

FIELD

Embodiments of the invention relate to handling pay for accessing content, in the form of a content object, in information centric networking (ICN) networks such as content centric networking (CCN) networks. Specifically, the embodiments relate to a method and system implemented by a content centric networking (CCN) gateway and an Advice of Charge (AoC) server to implement AoC enforcement and purchase request functionality in the ICN network and the access network.

BACKGROUND

An ICN network is a conceptualization of a networking protocol stack, in particular layers 3 and above of a network protocol stack. The CCN network as well as similar networks like named data networking (NDN) networks are particular architectures and implementations of an ICN network. ICN, CCN, and NDN networks are based on the premise of naming resources in these networks. In particular, the naming relates to the use of a globally shared namespace for objects that allows entities in these networks to retrieve any content of interest. NDN networks and CCN networks have similar architectures, and for sake of clarity, examples related to CCN networks are discussed herein below.

Thus, within a CCN network, a name is utilized to identify a content object instead of an Internet Protocol (IP) address of the host of the content. In an IP network, routing is based on host names (e.g., source and destination addresses). In a CCN network by contrast, routing is based on a uniform resource identifier (URI) or similar identifier for a content object. CCN routing is performed hop-by-hop, using longest prefix matching on the CCN name. All communications seeking to access data are framed as a request and response transaction. A CCN client (e.g., executed by user equipment) sends a message referred to as a CCN interest packet to the nodes in the CCN network. The nodes of the CCN network respond with a CCN object identified by a CCN name in the CCN interest. These CCN objects are returned via a CCN response.

All content object packets are cryptographically signed by their initial provider. A CCN client can thus verify the integrity and authenticity of the content even if the packet comes from untrusted links or untrusted hosts. As a direct effect, CCN nodes in the CCN network are allowed to cache packets locally in a table called the content store. When a CCN node receives a CCN interest packet, the CCN node can check whether its local content store has the requested CCN object and, if so, can send the CCN object to the requesting CCN client. The look up in the content store is by the CCN name. If the CCN name is not found in the local content store, then the CCN interest is forwarded according to entries for the CCN name in a forwarding information base (FIB) of the CCN node.

SUMMARY

A method for executing advice of charge (AoC) enforcement is implemented in a computing device. The computing device also implements a content centric networking (CCN) gateway, where the CCN gateway is part of a CCN network. The method includes receiving a CCN interest packet from a user equipment in a network external to the CCN network, the CCN interest packet including a CCN name, and looking up a prefix of the CCN name in an AoC table. The method further includes in response to determining a match between the prefix of the CCN name and an entry in the AoC table, generating an AoC request and forwarding the AoC request toward an AoC server identified by the entry in the AoC table determined to be the match with the prefix of the CCN name, and in response to not determining the match between the prefix of the CCN name and the entry in the AoC table or in response to receiving a purchase accepted response from the AoC server, retrieving a CCN object identified by the CCN name and forwarding the CCN object to the user equipment in the network external to the CCN network from which the CCN interest packet was received.

A network device implements a method for executing advice of charge (AoC) enforcement. The network device implements a content centric networking (CCN) gateway, where the CCN gateway is part of a CCN network. The network device includes a non-transitory computer-readable medium having stored therein an AoC enforcement module, and a processor coupled to the non-transitory computer-readable medium. The processor is configured to execute the AoC enforcement module. The AoC enforcement module is configured to receive a CCN interest packet from a user equipment in a network external to the CCN network. The CCN interest packet includes a CCN name. The AoC enforcement module is configured to look up a prefix of the CCN name in an AoC table, and in response to determining a match between the prefix of the CCN name and an entry in the AoC table, to generate an AoC request and to forward the AoC request toward an AoC server identified by the entry in the AoC table determined to be the match with the prefix of the CCN name. In response to not determining the match between the prefix of the CCN name and the entry in the AoC table or in response to receiving a purchase accepted response from the AoC server, the AoC enforcement module is configured to retrieve a CCN object identified by the CCN name and to forward the CCN object to the user equipment in the network external to the CCN network from which the CCN interest packet was received.

In another embodiment, a method for performing advice of charge (AoC) purchase functions is executed by a computing device. The computing device implements an AoC server in a content centric networking (CCN) network. The method includes receiving an AoC request from an AoC CCN gateway in the CCN network, where the AoC request includes a name of a CCN object and a unique user identifier, generating an AoC purchase request and sending the AoC purchase request to a user equipment associated with the unique user identifier, and generating a purchase accepted response to be sent to the AoC CCN gateway, in response to receiving a purchase approval from the user equipment.

A computing device implements a method for executing advice of charge (AoC) purchase functions, wherein the computing device implements an AoC server in a content centric networking (CCN) network. The computing device includes a non-transitory machine-readable storage medium having stored therein an AoC purchase function module, and a processor communicatively coupled to the non-transitory machine-readable storage medium. The processor is configured to execute the AoC purchase function module. The AoC purchase function module is configured to receive an AoC request from an AoC CCN gateway in the CCN network, where the AoC request includes a name of a CCN object and a unique user identifier, to generate an AoC purchase request and to send the AoC purchase request to a user equipment associated with the unique user identifier, and to generate a purchase accepted response to be sent to the AoC CCN gateway, in response to receiving a purchase approval from the user equipment.

BRIEF DESCRIPTION OF THE DRAWINGS

The invention may best be understood by referring to the following description and accompanying drawings that are used to illustrate embodiments of the invention. In the drawings:

FIG. 6C illustrates various exemplary ways in which virtual network elements (VNEs) may be coupled according to some embodiments of the invention.

FIG. 6D illustrates a network with a single network element (NE) on each of the NDs of FIG. 6A.

FIG. 6E illustrates an example where each of the NDs implements a single NE (see FIG. 6D), but the centralized control plane has abstracted multiple of the NEs in different NDs into a single NE in one of the virtual network(s) of FIG. 6D, according to some embodiments of the invention.

FIG. 6F illustrates a case where multiple VNEs are implemented on different NDs and are coupled to each other, and where the centralized control plane has abstracted these multiple VNEs such that they appear as a single VNE within one of the virtual networks of FIG. 6, according to some embodiments of the invention.

DETAILED DESCRIPTION

Figure 1:
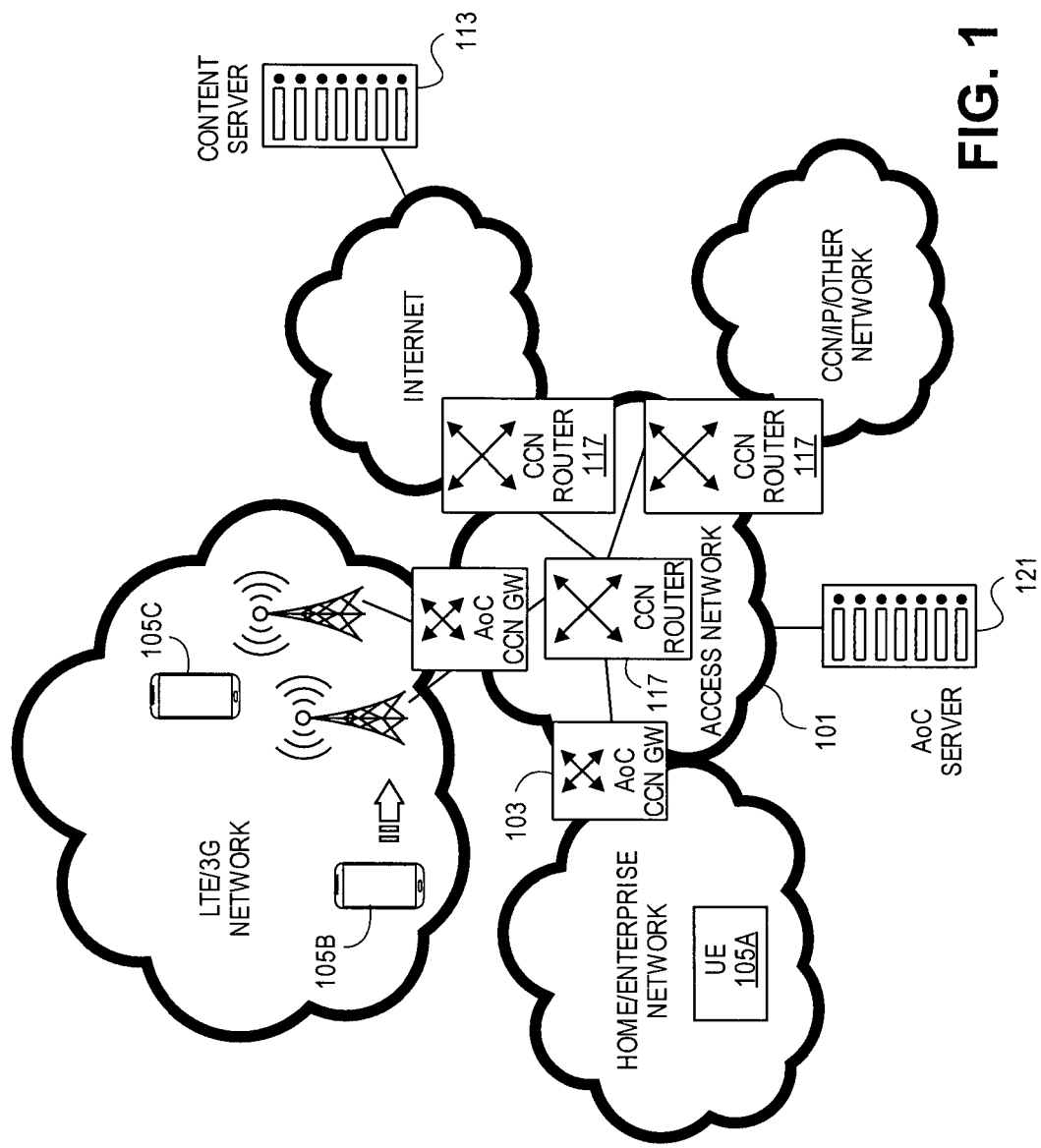
FIG. 1 is a diagram of one embodiment of a CCN network including placement of CCN gateways, CCN routers and content servers in the CCN network.

The following description describes methods and apparatus for implementing Advice of Charge (AoC) enforcement at a content centric networking (CCN) gateway and purchase functions at an AoC server. In these embodiments, the CCN gateway can also be referred to as an AoC enforcement node as it implements this functionality. Between these two nodes and the implementation of these functions, full support for AoC is implemented in a CCN network while maintaining the decentralized advantages of caching CCN objects at CCN gateways. The AoC support is compatible with AoC functions related to the CCN objects of the operator of the CCN network as well as content objects provided by third party networks.

References in the specification to "one embodiment," "an embodiment," "an example embodiment," etc., indicate that the embodiment described may include a particular feature, structure, or characteristic, but not every embodiment may necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Advice of Charge in Internet Protocol Networks

AoC is a function implemented in a network to determine and process a charge (i.e., a cost or expense) for accessing some requested content. Where AoC functionality is implemented in an IP network, there is a node in the core of the IP network that enforces AoC, referred to as an AoC enforcement node. An AoC server and an online charging system (OCS) are also needed to complete the AoC architecture in IP networks.

The AoC enforcement node detects requests to access content behind a paywall or content otherwise designated as requiring payment for access rights. The AoC enforcement node can perform redirection on hypertext transfer protocol (HTTP) to intercept and manage these content requests. By doing this, when a request for protected paid content is detected, a redirection of the request is sent towards the AoC server by the AoC enforcement node. The AoC server generates a purchase notification page, which the user needs to accept to be redirected to the content.

In some embodiments, the AoC enforcement node can be an application function (AF) node, for example a Service Aware Support Node (SASN), or similar computing device that performs the AoC enforcement functions. In the AoC architecture for IP networks, the AF node is positioned between the Packet Core and the Internet and it can perform redirections either to AoC servers inside the operator network or to third party content servers.

Implementing the AoC functions involves the exchange of a set of messages between the different nodes participating in the AoC service including the AoC enforcement node, the AoC server and/or the OCS. This sequence begins with a user via user equipment (e.g., a computer or handheld device) requesting content, in this example sequence referred to as 'content A.' The request for content A is detected by an AF node, which performs a redirection of the request to the AoC server. Upon receiving the redirection of the request at the AoC server, the AoC server may send a pricing request to the OCS for the content A that was requested by the user. In this case, the OCS answers the pricing request with a current cost for accessing content A. The AoC server generates the purchase notification page including the cost returned by the OCS. The user interacts with this page to authorize payment or similarly authorizes access to the requested content A. If the purchase notification page is successfully negotiated, then the AoC server sends a redirection to content A. In this example embodiment, the AF node detects that the purchase has been accepted and receives the redirected user request for content A. In some embodiments, the AF node requests a quota to serve content A from the OCS. The OCS sends the quota to AF node. The AF node can now forward the request for content A to the content server of content A. Content A is then sent to the user by the content server. The AF node reports the charge for the content served and the OCS acknowledges it.

User Identification

AoC functions rely on the ability of the network to uniquely identify each user. To be able to implement AoC, the AoC enforcement node needs to know who each user of the network is and whether they have permission to access a given content object. In mobile networks, this problem is solved following the Third Generation Partnership Project (3GPP) Technical Specification (TS) 32.426 where the standard describes the attach procedures. These procedures describe the way in which any device has to connect to the network. Once the procedure ends successfully, the user equipment can start forwarding and receiving traffic, which can always be associated with that subscriber. In some embodiments, the Evolved Packet Core (EPC) architecture connects with different access networks for which the same concepts appear. It is important to notice that all traffic in these different networks will go through a Serving Gateway and/or a Packet Data Network (PDN) Gateway, which can then implement the AoC functions in the same manner as described for the AF node.

Information Centric Networks

FIG. 1 is a diagram of one example of an architecture of a content centric networking (CCN) network. The CCN network in this example is an access network 101. The access network 101 is in communication with a set of separately administered networks including a home/enterprise network, the Internet and an LTE/3G mobile network. The example shows that the access network can be further in communication with any number of additional CCN networks, IP networks or other types of networks. In this example, the access network implements the AoC enforcement and purchase processes described further herein below and is provided by way of example and not limitation. A CCN network can be utilized in other contexts such as home networks, enterprise networks, or similar independently administered public or private networks.

The access network can have any number of nodes and can utilize any combination of layer 1 and layer 2 protocols for communication between the CCN nodes of the access network 101. For sake of clarity, the nodes implementing the AoC enforcement system are shown and described. The CCN nodes are network devices (ND), as discussed further herein below. The CCN nodes include a set of CCN routers 117 and CCN gateways (GW) 103. The CCN routers 117 manage CCN interest packets, forwarding these packets toward the corresponding content server 113 and managing the content response messages by forwarding them toward the requesting user equipment 105A-C.

The CCN nodes that communicate with the user equipment 105A-C in the separately administered networks are the CCN gateways 103. The user equipment 105A-C can be any type of user device including mobile devices, laptop computers, desktop computers, console devices, workstations and similar computing devices. The CCN gateways 103 identify users of the user equipment 105A-C and apply the AoC enforcement processes for managing access to CCN objects between the user equipment 105A-C content servers 113.

The content server 113 can be any computing device in communication with the access network 101. The access network 101 can be in communication with any number and variety of content servers 113. The content server 113 can be a server or similar computing device that hosts a set of services and resources such as data stores including web pages, audio/visual content, documents and similar static and/or dynamically generated data.

An AoC server 121 can be in communication with the access network 101. The AoC server 121 manages the tracking of purchases and similar grants of access to content provided by the content servers 113. In some embodiments, the AoC servers 121 work in conjunction with OCS to provide these services. The CCN gateways 103 in some embodiments implement AoC enforcement such that these CCN gateways 103 can be referred to herein as AoC CCN gateways 103. The AoC CCN gateways can rely on the AoC server to implement AoC purchase functions between the user equipment 105A-C and the CCN nodes. The process of implementing AoC purchase functions at the AoC server 121 and AoC enforcement at the AoC CCN gateway 103 is described further herein below.

Figure 2:
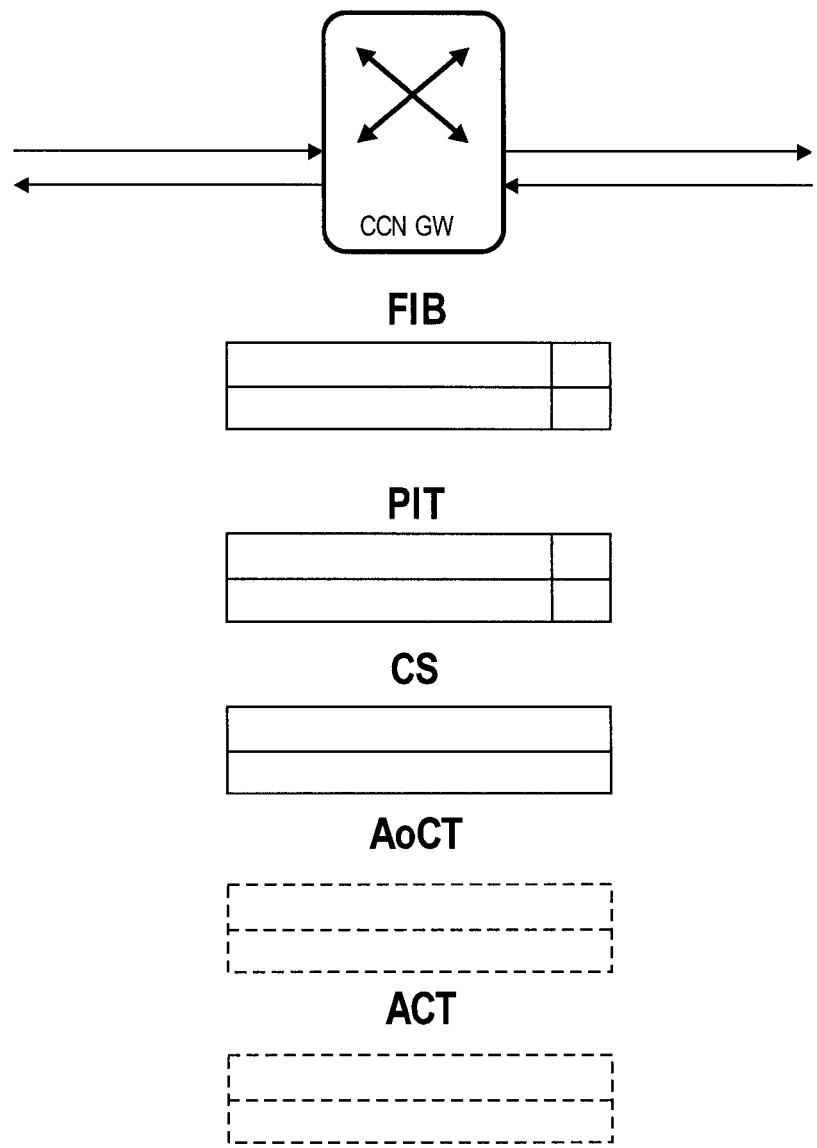
FIG. 2 is a diagram of one embodiment of an example set of data structures maintained by an AoC CCN gateway node.

FIG. 2 is a diagram of one embodiment of the set of data structures maintained by CCN nodes. The CCN nodes such as CCN routers and CCN gateways maintain three or four sets of tables for tracking information related to CCN. In prior systems, only three tables were typically maintained. The existing CCN tables include the forwarding information base (FIB), the pending interest table (PIT) and the content store (CS). In some embodiments, a fourth table and/or fifth set of tables can be maintained in the form of an advice of charge table (AoCT) and an accepted content table (ACT). The FIB is equivalent to the routing table in IP, where destination addresses and networks for particular content objects identified by CCN names are matched with an output interface. In CCN, the IP prefixes utilized for matching on the routing table are replaced with content name prefixes of the CCN names.

The PIT stores the CCN interest packets that have been received at an ingress port of the CCN node, but that have not been responded to yet. The entries of these CCN interest packets are referred to as 'pending interests' and are removed from the PIT when a corresponding CCN object is sent toward the originating user equipment that generated the CCN interest packet that was received via the associated ingress port or when the pending interest times out.

The CS is an optional local cache of CCN objects. This cache is optional and can have any size or store any number of CCN objects. CCN nodes can choose not to cache anything (for example in a core network where cache size would need to be huge in order to maximize cache hits). In one embodiment, the CS stores a set of recently received CCN objects.

In one embodiment, one or two new tables are added. The first table is the AoCT. The AoCT table stores the contents for which AoC is enabled and towards which AoC server the AoC CCN gateway needs to send AoC requests. This table has two fields for each entry. A name prefix field and an AoC server field. The name prefix field is the first part of the CCN name of CCN objects that are requested and that are pay-per-view content or similarly restricted content. The second field is the AoC server field. The AoC server field holds a value of a domain name of the AoC server towards which the AoC CCN Gateway is to send a request to notify the user or user equipment that the requested content requires a purchase, for the pay-per-view content or similarly controlled content.

The ACT stores the content domains that a user can access because the AoC server has approved them for that user. The entries of this table may have a timeout to remove them when they are no longer useful. In one embodiment, this table has two fields. The first field is a domain field and the second field is a user field. The domain field stores a name prefix of the CCN name of a CCN object that a particular user can access, where the user is identified with a unique user identifier. The user field is used to uniquely identify the user connected to the network via the unique user identifier. The unique user identifier doesn't need to be a global unique identifier; a locally unique identifier is sufficient. It may even be the physical port through which the user is reached. In one embodiment if using this example, each port of the CCN node can only be used to connect one user to the network.

Each CCN node also provides a set of network interfaces also referred to as "faces" over which CCN interest packets are received and forwarded and similarly over which CCN response packets are received and forwarded. In the example illustration, the CCN node includes three network interfaces, which are faces 1, 2, and 3. These network interfaces can represent a physical link or a Layer 2 interface. The network interfaces can also represent, in some embodiments, a transport protocol such as TCP/IP (in overlay mode) or even an application.

The basic data traffic forwarding in CCN is typically performed as explained below with an example sequence:

1. A CCN interest packet arrives through a face (network interface).
2. The CCN node checks whether it has the requested CCN object stored in its CS.
3. If the CCN object is found in the CS, then go to step 7.
4. If the CCN object is not found in the CS, then a check is made whether the same content has already been requested, by looking for a PIT entry that matches the CCN name.
5. If a matching PIT entry is found, then update the matching PIT entry by adding the network interface through which the CCN interest was received. In this case, the process then exits.
6. If no matching PIT entry is found, then a new entry is created in the PIT for the CCN name, and the CCN interest is forwarded toward the content server according to CCN name prefix matching using the FIB.
7. When a CCN object arrives through a network interface in a CCN response packet, then forward the CCN response packet to each of the network interfaces listed in the related PIT entry. If the CCN object was found in the content store, then forward it to the network interface over which the corresponding CCN interest packet was received.

In the IP networks of the prior art, the IP networks are structured such that a single IP node that can be referred to as a packet gateway performs the role of gateway to the IP network, such as an access or operator network. In these architectures, all the data traffic will go through this packet gateway. For instance, in mobile networks, as mentioned above, there is always a serving gateway and PDN gateway (also known as EPG, Evolved Packet Gateway) that are the only entry/exit points of the access network to other networks such as the Internet. This creates a single point for various types of policy enforcement, but at the same time, this is a bottleneck for the network.

AoC Enforcement Function

The AoC enforcement function enforces AoC functionality upon the reception of a CCN interest packet from a user via the associated user equipment at the AoC CCN gateway. The AoC enforcement function checks if the requested content requires AoC, checks if the user or user equipment has already purchased the content and generates an AoC request towards an AoC server in case it is needed and then waits for a response from the AoC server with what to do with the user CCN interest. Finally, the CCN interest will be dropped if the response from the AoC server is negative or forwarded if the response is positive.

Purchase Request Function

Upon the reception of an AoC request from the AoC CCN gateway, the AoC server builds a purchase request. The purchase request is specific to the user (e.g., using a unique user identifier, an identifier that is unique to the user) or user equipment that generated the CCN interest associated with the AoC request. The purchase request is also specific to the CCN object requested and any other information needed that is stored either locally or in another node accessed via an interface such as an Online Charging System (OCS). The purchase request is sent to the user or user equipment and an answer is expected. If an answer to the purchase request is not received after some defined time, then a timeout occurs and the transaction is removed from a transaction database maintained by the AoC server after sending a negative response to the AoC CCN Gateway. When the purchase response is received from the user or user equipment, the AoC server builds an AoC response message and sends it to the AoC CCN Gateway. User purchases may be stored in a database in the CCN node (i.e., the AoC CCN gateway) to answer future AoC request messages that match the same user and content.

Figure 3A:
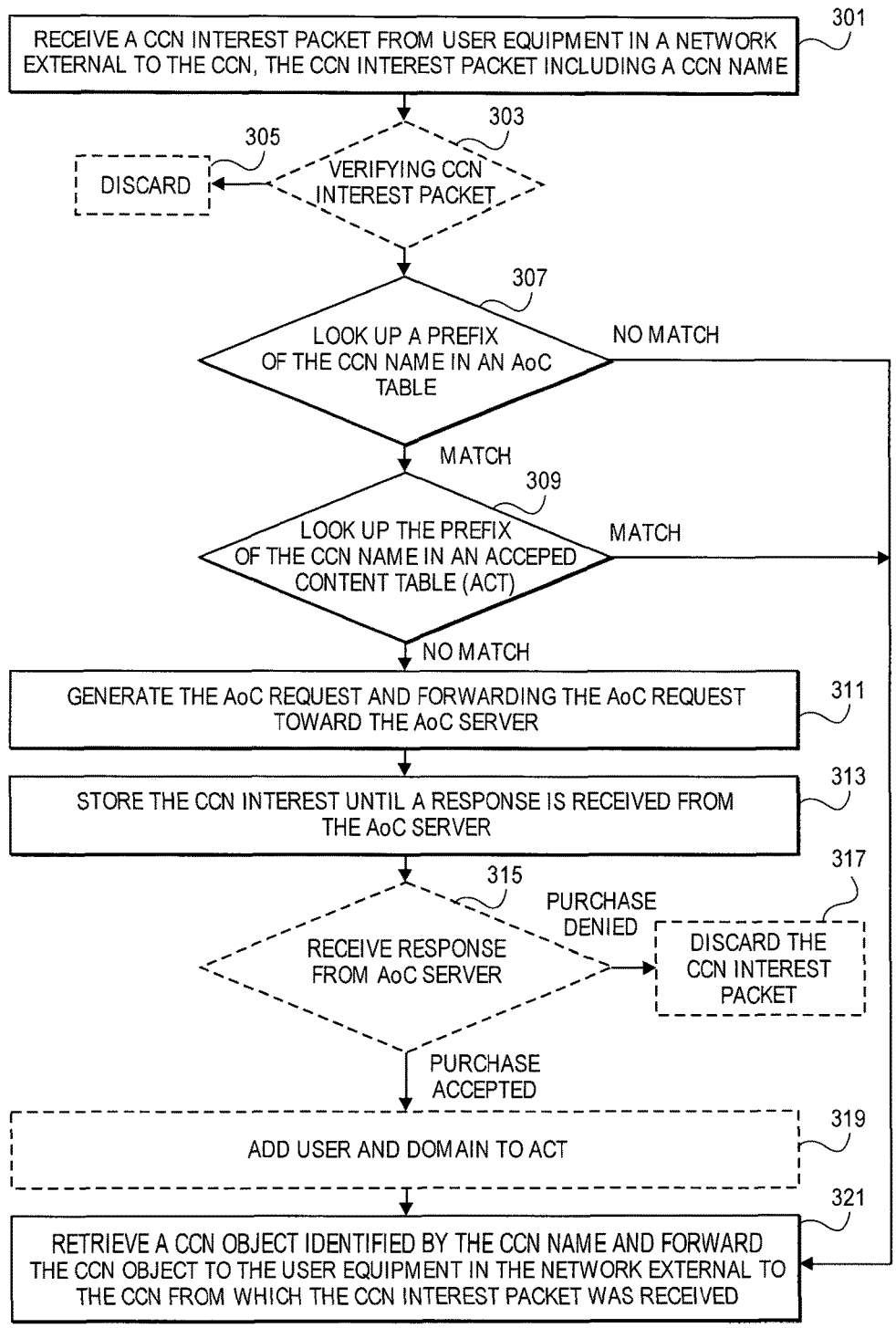
FIG. 3A is a flowchart of one embodiment of a process for AoC enforcement at the AoC CCN gateway.

FIG. 3A is a flowchart of one embodiment of a process for AoC enforcement at the CCN gateway. This process is implemented by the AoC enforcement module that is executed by an AoC CCN gateway. The process is initiated in response to receiving a CCN interest packet from a user via user equipment (Block 301). The CCN interest packet is received from a user equipment or similar node in a network external to the CCN network. The CCN interest packet includes a CCN name of a CCN object. The process then verifies the CCN interest packet (Block 303). If the CCN interest packet is not a valid CCN interest packet, then the CCN interest packet is discarded and not further processed (Block 305). After verifying the integrity of the packet and before looking at whether the CCN object is in the content store (CS), the process checks whether there is any name prefix in the AoC table that matches with the CCN name in the received CCN interest packet (Block 307).

If there is no match, then the process moves forward by retrieving the CCN object identified by the CCN name in the CCN interest packet and returns the CCN object to the requesting user equipment in the external network upon successful retrieval (Block 321). However, where there is a match found in the AoC table, then the process performs a lookup of the prefix of the CCN name of the CCN object in the accepted content table (Block 309).

If the prefix of the CCN name is found in the accepted content table, the process continues by retrieving the CCN object identified by the CCN name in the CCN interest packet in the local content store and forwarding the CCN object to the requesting user equipment in the external network upon successful retrieval (Block 321).

However, if there is not a match, the process then checks if the user has already purchased that CCN object by looking in the ACT for an entry for the user and the domain requested in the CCN interest packet. The domains stored in the ACT are considered as name prefixes and must match with the content requested. If there is an entry in the ACT for the user, then the CCN object is approved for the user and the process can retrieve the CCN object identified by the CCN name in the CCN interest packet from the local content store and forward the CCN object to the requesting user via the associated user equipment. However, if the match is not found, then the process generates an AoC request to be sent to the AoC server. The AoC request is generated and forwarded to the AoC server pointed to in the entry of the ACT (Block 311). The CCN interest packet is stored in memory until a response is received from the AoC server (Block 313). A timeout may also be set to avoid the CCN interest packet being stored in memory indefinitely. For example, a typical value for this timeout may be 30-60 seconds as used in many charging interfaces. It is to be noted that this timeout needs to be equal to or greater than the timeout in the AoC server.

The AoC server will respond with a purchase accepted response or a purchase denied response. A check is made upon the reception of a response from the AoC server whether the purchase was accepted or denied (Block 315). If the response is positive (i.e., the purchase is accepted), then the process adds an entry in the ACT table for the user (e.g., using the unique user identifier) and the domain received in the response (Block 319). Then the process follows the standard CCN process by checking if the CCN object that has been requested is in the local content store and forwarding it to the requesting user via the associated user equipment if found (Block 321). The process forwards the CCN interest packet according to the FIB table if the CCN object requested is not in the content store. If the response to the AoC request is negative (i.e., the purchase has been denied) or a timeout occurs, then the process discards the received CCN interest packet sent by the user (Block 317).

The embodiments might be simplified by not keeping the CCN interest packet in memory. This would make the solution stateless, because nothing will happen if the purchase is denied or a timeout happens, and the user generated CCN interest packet could be rebuilt from the information in the AoC response (i.e., the unique user identifier and CCN name from the CCN interest are available). However, the above stateful embodiments provide some benefits, because other important information may be lost when using a stateless process, such as where the approach is utilized that applications may use Type-Length-Value (TLV) fields as described in CCN documentation to send additional useful information to retrieve the requested CCN object.

Figure 3B:
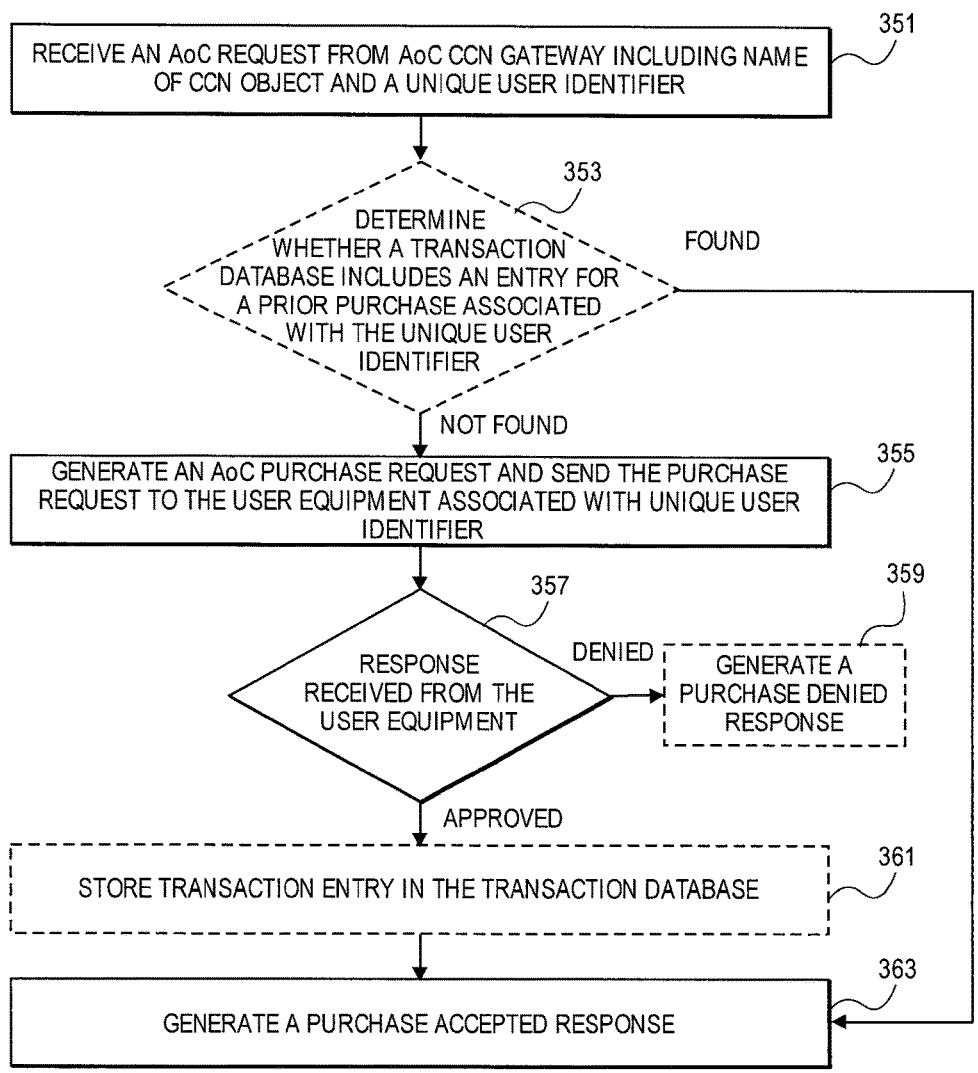
FIG. 3B is a flowchart of one embodiment of a process for purchase function processing at the AoC server.

FIG. 3B is a flowchart of one embodiment of a process for purchase function processing at the AoC server. The process is initiated when an AoC request message, with a CCN name and a unique user identifier, is received by the AoC server from the AoC CCN gateway (Block 351). A check may be performed using a transaction database storing a history of transactions as a set of transaction entries in the case that the process is designed to have stateful transactions. This transaction database can contain a table with each entry including a user (i.e., unique user identifiers) and the domain purchased by that user. If the CCN object identified in the AoC request has already been purchased (e.g., as indicated by a determination that the transaction database includes an entry for a prior purchase associated with the unique user identifier, Block 353), a positive response can be generated and sent to the AoC CCN gateway with no further work from the AoC server (Block 363). The positive response can be in the form of a purchase accepted response or similar message indicating that the user has permission to access the CCN object identified in the AoC request.

In one embodiment, if the transaction entry that matches the unique user identifier and domain name is not found or if there is not a transaction database, the process proceeds to generate a purchase request message to be sent to the user via associated user equipment. This purchase request is based on the CCN object requested and its CCN name, as well as the unique user identifier. This information and other information utilized in generating the purchase request message (e.g., the pricing of the CCN object) are stored either in a local database of the AoC server or accessed in a database external to the AoC server such as an interface towards an Online Charging System (OCS).

This purchase request is sent to the user via associated user equipment in a CCN interest packet or similar format (Block 355). Then the AoC server expects to receive either a purchase approval or a purchase denial response from the user or user equipment (Block 357). In some embodiments, if the response to the purchase request is not received within a defined time period, then the process times out. The time-out can have any duration. For example, in some embodiments, the time-out is between 30 and 60 seconds. If either the process times out or the response is a purchase denied, then the AoC server generates a purchase denied response to send to the AoC CCN gateway (Block 359).

However, if the response received from the user equipment associated with the unique user identifier is received before a time-out expires and indicates an approval from the unique user identifier, then the process proceeds to generate a purchase accepted response to be sent to the AoC CCN gateway (Block 363). In some embodiments, a transaction is at this time stored in the transaction database (Block 361). The transaction entry in the transaction database identifies the unique user identifier and the CCN object (e.g., using the CCN name of the CCN object). The entry stored in the transaction database can be referenced for future queries regarding the unique user identifier and the CCN object.

Either the purchase approval or the purchase denied responses should include the unique user identifier, the CCN name of the CCN object that was listed in the CCN interest packet that initiated the AoC request, and the content domain name in case the purchase was approved. In some embodiments, the generation of the purchase request is not an html page, rather any kind of data and structure defined by each application using the AoC server can implement the servicing of the AoC request. The purchase request on the user equipment may be displayed as a hypertext markup language (HTML) page, information in a mobile application or any other kind of interface as defined by the application. The CCN network is agnostic at this step of how the visualization will be performed on the user equipment (i.e., the client side). Thus, the embodiments are not limited to HTTP as AoC in IP networks. The CCN objects that are subject to the enforcement of AoC need to be properly structured so that access to these CCN objects can be offered for purchase and granted consistently.

In one embodiment, the AoC request and response messages that are sent to the user equipment associated with a unique user identifier have a format and description as follows. The AoC request message is a message sent by the AoC CCN gateway towards the AoC server to request what to do with a user request of content in the form of a received CCN interest packet. The feedback of the AoC server is required to enforce AoC. The AoC request sent by the AoC CCN gateway can be in the form of a CCN interest packet that includes the AoC server name, the unique identifier of the user, and the requested CCN object name.

Similarly, the AoC response message is a message sent by the AoC server to the AoC CCN gateway in response to the AoC request message. The AoC response message is a CCN object message where the content will be a response code plus the domain name that the user can access in the case where the purchase process ended successfully. The response code can be either PURCHASE ACCEPTED or PURCHASE DENIED. The name of the AoC request that was received from the AoC CCN gateway is also present in the AoC response messages such that it is possible to uniquely identify a request and a response using the AoC server name, unique user identifier, and CCN name of the CCN object requested.

Figure 4A:
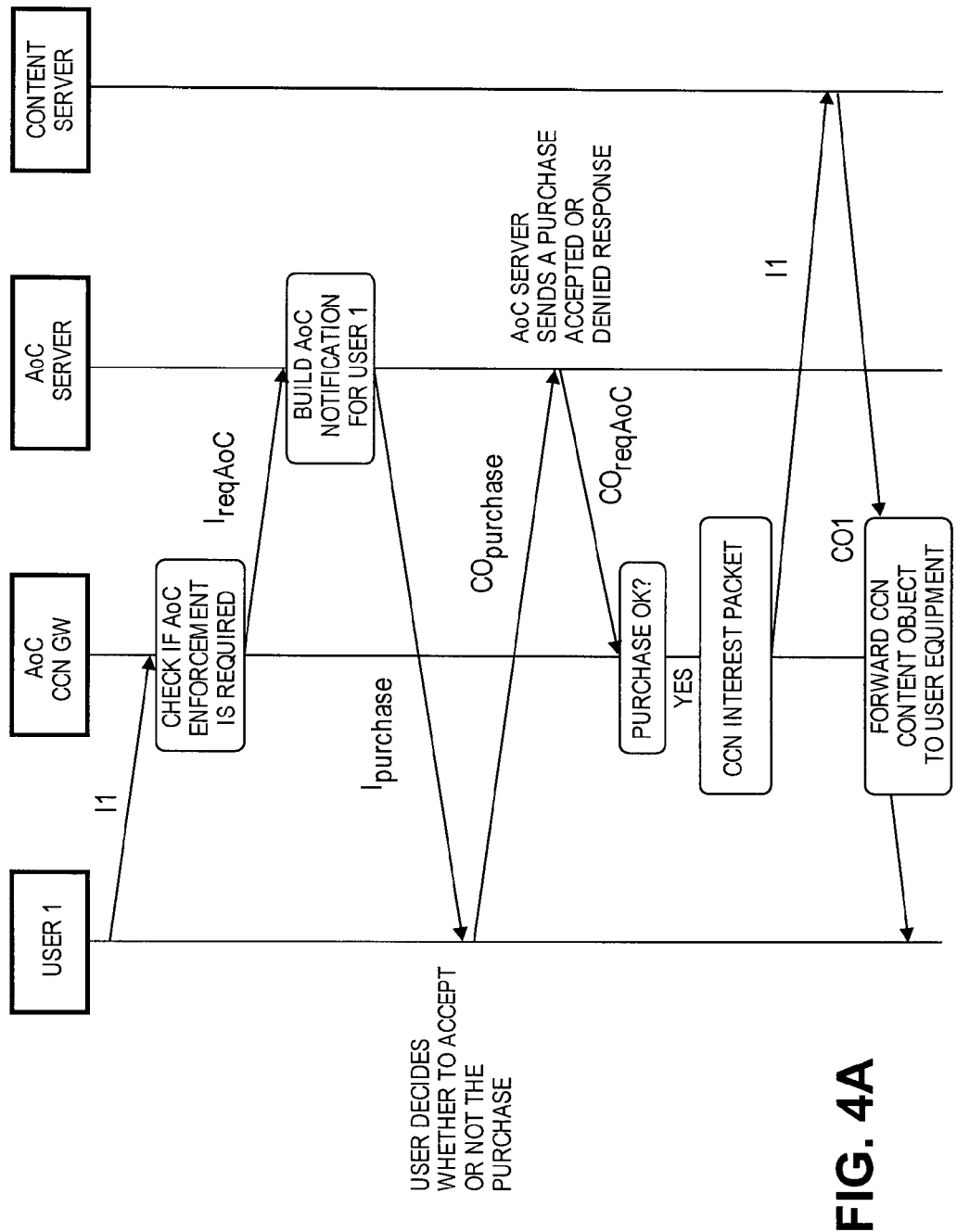
FIG. 4A is a timing diagram of one embodiment of a process for a user purchase of content.
Figure 4B:
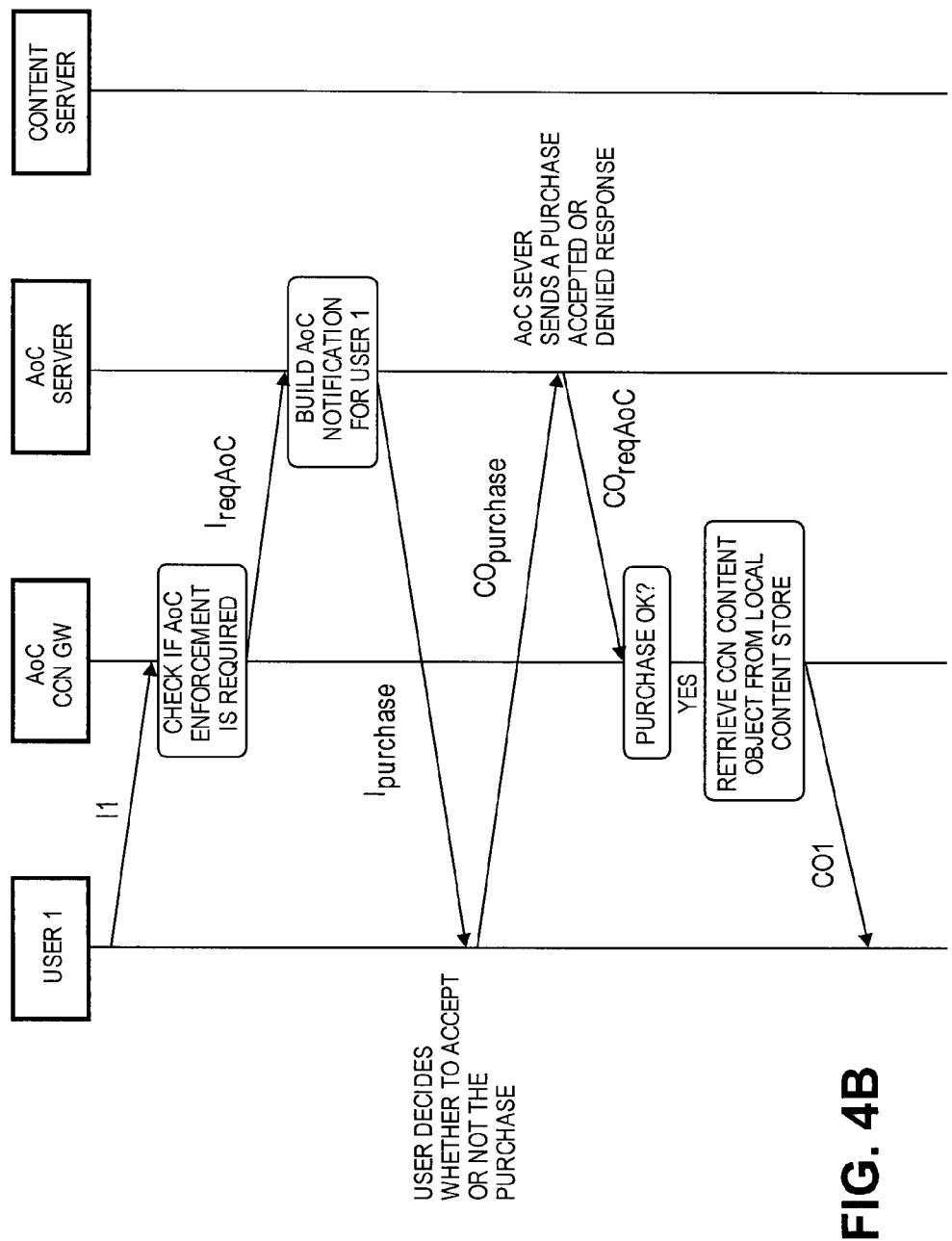
FIG. 4B is a timing diagram of another embodiment of a process for a user purchase of content.
Figure 4C:
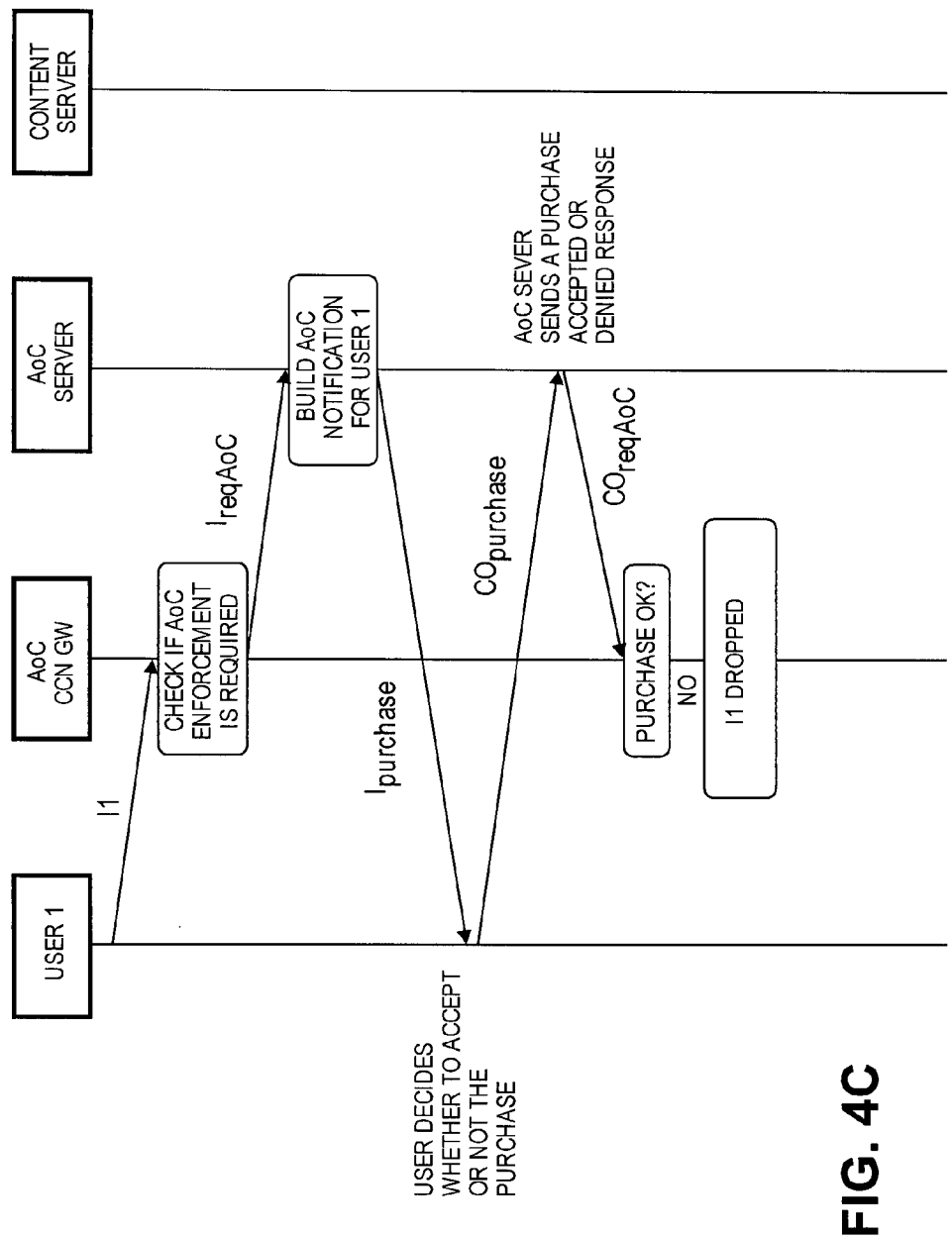
FIG. 4C is a timing diagram of a further embodiment of a process for a user purchase of content.

FIGS. 4A-4C present a set of use case scenarios where AoC is enforced and where a user provides differing input into the system. FIG. 4A is a timing diagram of one embodiment of a process for a user purchase of content. In this embodiment, the user purchases the content in question and the content is stored in the local content store of the AoC CCN gateway. In this example, the scenario begins where a user (User 1) generates an interest (I1) in the form of a CCN interest packet that is sent from the user equipment associated with the user to the AoC CCN gateway. At the AoC CCN gateway, the CCN interest packet is checked to determine whether AoC enforcement is required for a CCN object identified by the CCN interest packet.

In this scenario, the requested CCN object is determined to require AoC enforcement. This can be determined as discussed above using the AoCT and ACT. The query of the AoCT and more particularly the ACT also indicates that the permissions for the CCN object for the particular user are not known by the AoC CCN gateway. An AoC request ($I_{reqAoC}$) is then sent to the AoC server to determine the permissions for the CCN object.

At the AoC server, an AoC notification referred to as a purchase request notification ($I_{purchase}$) is generated and sent to the user equipment associated with the user (i.e., using a unique user identifier). The user must then decide whether to accept the purchase of the CCN object. This may involve the negotiation of the sale using any interface or purchasing process. If the user decides to make the purchase then a purchase notification response message ($CO_{purchase}$) is returned to the AoC server. The returned purchase notification response message is then analyzed to determine whether it is an acceptance of the purchase. In this example, the purchase is accepted and a purchase accepted response ($CO_{reqAoC}$) is sent to the AoC CCN gateway.

The AoC CCN gateway then determines whether the requested CCN object is available in a local content store. In some cases no local content store exists, while in other cases the CCN object is not cached in the local content store. In either case, the CCN interest packet is then forwarded to the content server, which forwards the requested CCN object to the AoC CCN gateway (CO1). The CCN object is then forwarded to the user via the user equipment.

FIG. 4B is a timing diagram of another embodiment of a process for a user purchase of content. In this alternative scenario, the CCN object is located in the local content store. The process is the same as the prior use case, except where the AoC CCN gateway no longer needs to request the CCN object from the content server. Instead, the CCN object is retrieved from the content store and forwarded directly to the user via the user equipment.

FIG. 4C is a timing diagram of a further embodiment of a process for a user purchase of content. In this embodiment, the user declines the purchase of the CCN object. Thus, the $CO_{purchase}$ message indicates this decline to the AoC server. The AoC server in turn then generates a purchase denied response ($CO_{reqAoC}$) that is sent to the AoC CCN gateway. Upon receipt of the purchase denied response, the AoC CCN gateway checks the response to determine that it is a denied response. Then the CCN interest packet can be dropped (i.e., refused) to complete the implementation of the AoC enforcement.

Architecture

Figure 5A:
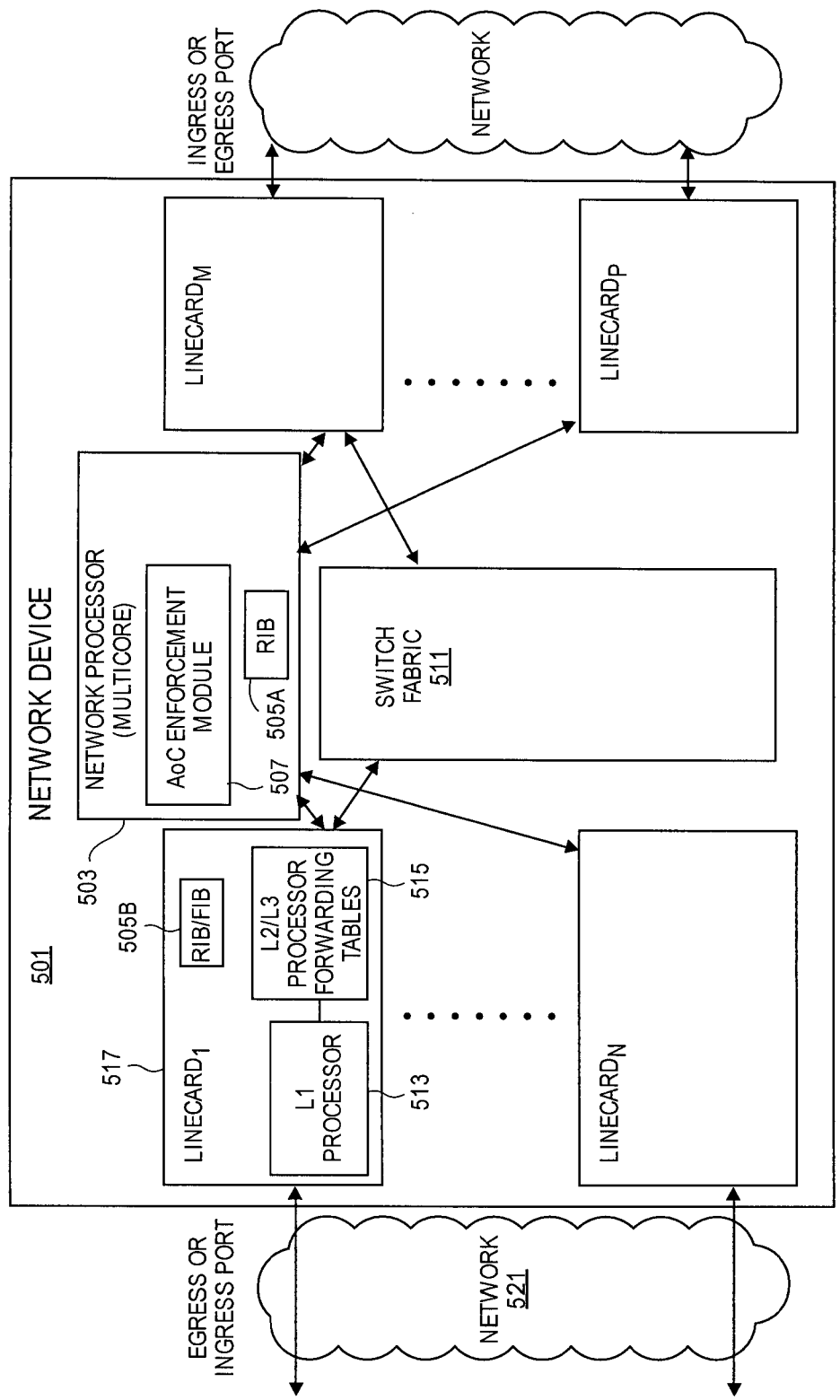
FIG. 5A is a diagram of one embodiment of a network device (ND) implementing a process for managing AoC enforcement.

FIG. 5A is a diagram of one embodiment of a network device implementing the AoC enforcement process and system. A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

In one embodiment, the AoC enforcement process is implemented by a network device 501 or similar computing device. The network device 501 can have any structure that enables it to receive data traffic and forward it toward its destination. The network device 501 can include a network processor 503 or set of network processors that execute the functions of the network device 501. A 'set,' as used herein, is any positive whole number of items including one item. The network device 501 can execute an AoC enforcement module 507 to implement the functions of managing the access to content objects where the network device 501 functions as an AoC CCN gateway as described herein above via a network processor 503.

The network device 501 connects with separately administered networks that have user equipment and/or content servers. The network processor 503 can implement the AoC enforcement module 507 as a discrete hardware, software module or any combination thereof. The network processor 503 can also service the routing information base 505A and similar functions related to data traffic forwarding and network topology maintenance. The routing information base 505A can be implemented as match action tables that are utilized for forwarding protocol data units PDUs (i.e. packets). The functions of the AoC enforcement module 507 can be implemented as modules in any combination of software, including firmware, and hardware within the network device. The functions of the AoC enforcement module 507 that are executed and implemented by the network device 501 include those described further herein above.

In one embodiment, the network device 501 can include a set of line cards 517 that process and forward the incoming data traffic toward the respective destination nodes by identifying the destination and forwarding the data traffic to the appropriate line card 517 having an egress port that leads to or toward the destination via a next hop. These line cards 517 can also implement the forwarding information base 505B, or a relevant subset thereof. The line cards 517 can also implement or facilitate the AoC enforcement module 507 functions described herein above. The line cards 517 are in communication with one another via a switch fabric 511 and communicate with other nodes over attached networks 521 using Ethernet, fiber optic or similar communication links and media.

The operations of the flow diagrams have been described with reference to the exemplary embodiment of the block diagrams. However, it should be understood that the operations of the flowcharts could be performed by embodiments of the invention other than those discussed, and the embodiments discussed with reference to block diagrams can perform operations different from those discussed with reference to the flowcharts. While the flowcharts show a particular order of operations performed by certain embodiments, it should be understood that such order is exemplary (e.g., alternative embodiments may perform the operations in a different order, combine certain operations, overlap certain operations, etc.).

As described herein, operations performed by the network device 501 may refer to specific configurations of hardware such as application specific integrated circuits (ASICs) configured to perform certain operations or having a predetermined functionality, or software instructions stored in memory embodied in a non-transitory computer readable storage medium. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. One or more parts of an embodiment of the invention may be implemented using different combinations of software, firmware, and/or hardware.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) to establish network connections (to transmit and/or receive code and/or data using propagating signals) with other electronic devices. One or more parts of an embodiment of the invention may be implemented using different combinations of software, firmware, and/or hardware.

Figure 5B:
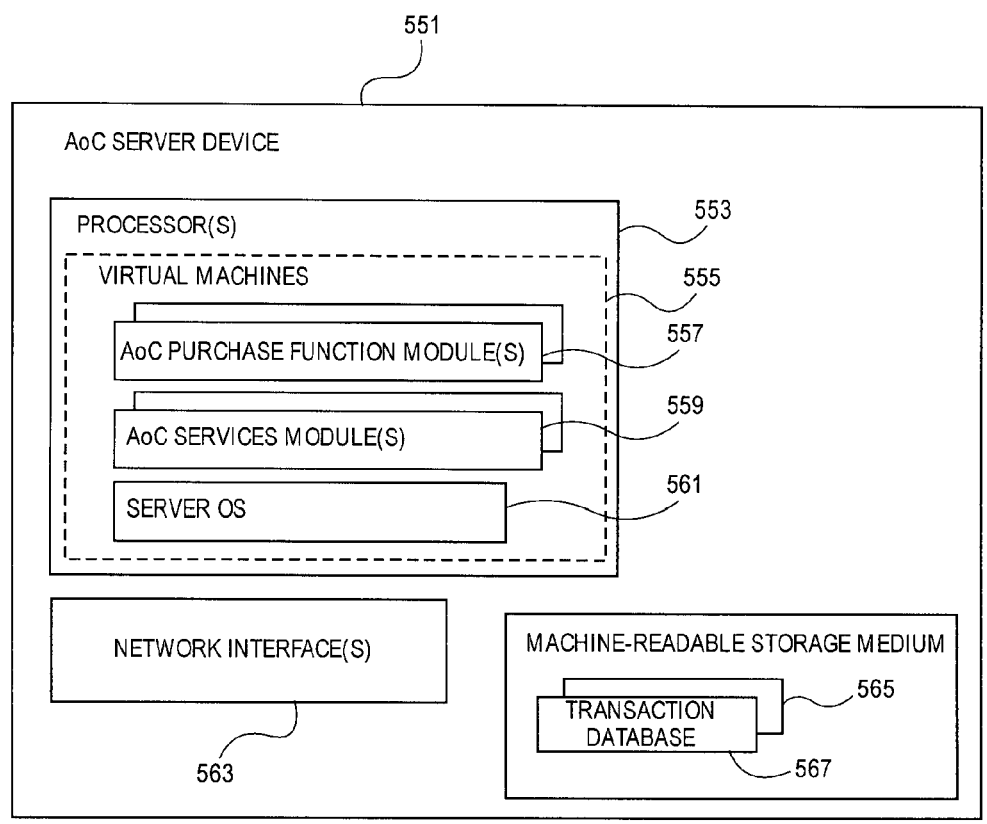
FIG. 5B is a diagram of one embodiment of a computing device implementing a process for managing AoC purchase functions.

FIG. 5B is a diagram of one embodiment of a computing device implementing a process for managing AoC enforcement. The computing device implements an AoC server device 551 that executes the AoC purchase functions as described herein above as well as other AoC functions. The AoC server device 551 can also implement other networking and CCN related functions in addition to the AoC functions described herein. The AoC server device 551 can be a dedicated server, a workstation, desktop computing device, a set of distributed computing devices including a cloud service or similar distribute computing environment.

The AoC server device 551 can include a set of processors 553 that execute the AoC purchase function modules 557 that implement the purchase functions described herein. The purchase functions of the AoC server device can be distributed over any number of discrete modules 557 or instances thereof. In some embodiments, the processors 553 can be utilized to execute a virtual machine 555 or set of virtual machines that provide a virtual environment in which the AoC purchase modules 557 can be executed.

The processors 553 can also execute related AoC services (e.g., using AoC services modules 559) as well as other application and software to support the AoC purchase function module 557. The supporting software can include server operating system software 561 and similar supporting software. In other embodiments, the virtual machines 555 can implement virtual operating systems upon which the AoC purchase function modules 557 operate. The embodiments can encompass any combination of virtualized and discrete hardware implementations working separately or in a distributed environment.

The AoC includes additional hardware and software components to implement the requisite functionality including a set of network interfaces 563 and machine-readable storage medium 565. The network interfaces 563 enable communication with any number of other devices over the CCN network or similar networks. The devices in communication with the AoC server include the AoC CCN gateway and similar devices. The machine-readable storage medium 565 can store the code for the AoC purchase function modules 557 as well as other software of the AoC server device 551. In addition, the machine-readable storage medium 565 can store a transaction database 567 that tracks the transactions being handled between user equipment associated with user having unique user identifiers and the AoC server device 551. The transaction database 567 can store any number of transaction database entries and can be managed by any sort of database management system including a relational database management system or similar database management systems.

Figures 6A, 6B:
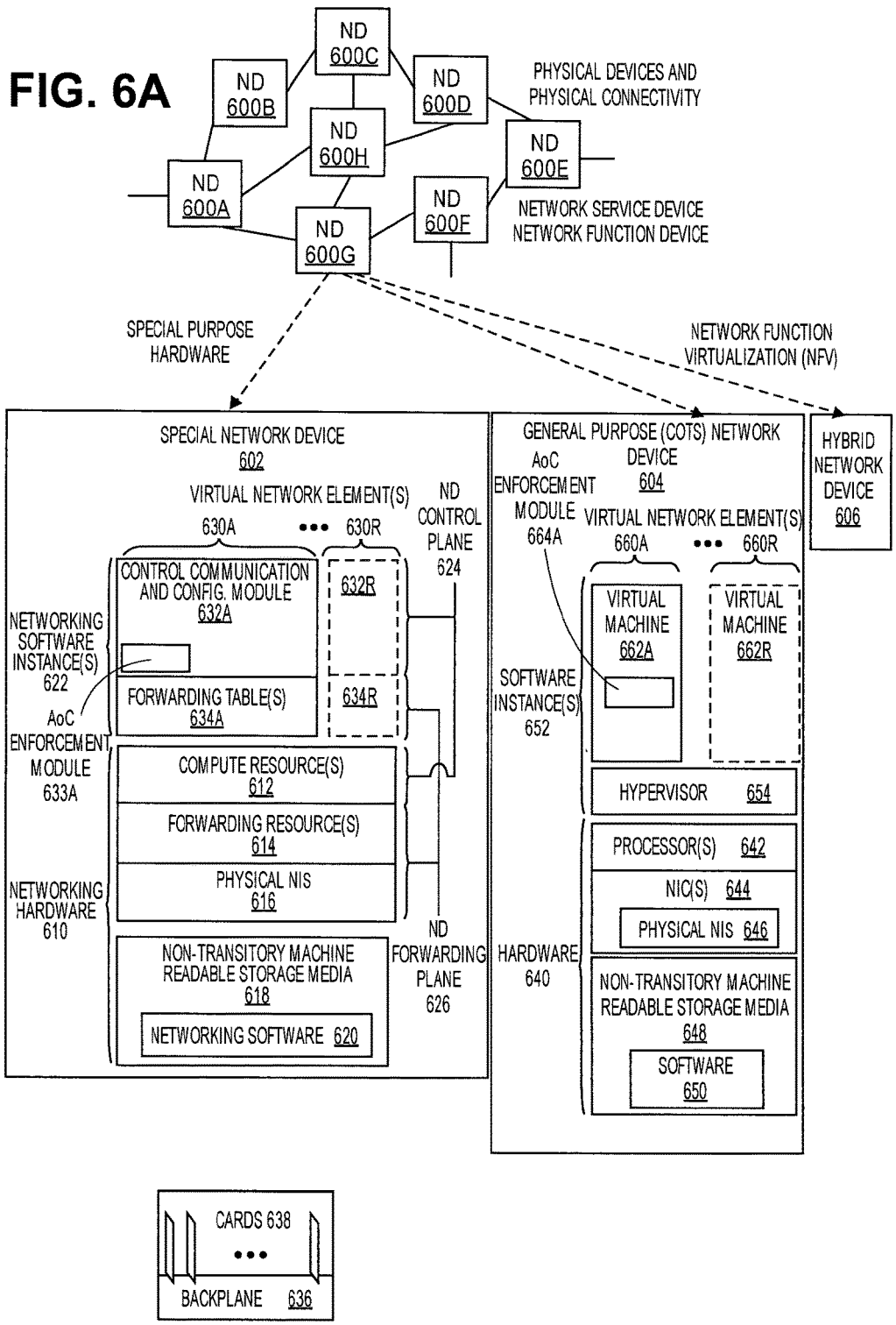
FIG. 6A illustrates connectivity between network devices (NDs) within an exemplary network, as well as three exemplary implementations of the NDs, according to some embodiments of the invention.
FIG. 6B illustrates an exemplary way to implement the special-purpose network device according to some embodiments of the invention.

FIG. 6A illustrates connectivity between network devices (NDs) within an exemplary network, as well as three exemplary implementations of the NDs, according to some embodiments of the invention. FIG. 6A shows NDs 600A-H, and their connectivity by way of lines between A-B, B-C, C-D, D-E, E-F, F-G, and A-G, as well as between H and each of A, C, D, and G. These NDs are physical devices, and the connectivity between these NDs can be wireless or wired (often referred to as a link) An additional line extending from NDs 600A, E, and F illustrates that these NDs act as ingress and egress points for the network (and thus, these NDs are sometimes referred to as edge NDs; while the other NDs may be called core NDs).

Two of the exemplary ND implementations in FIG. 6A are: 1) a special-purpose network device 602 that uses custom application—specific integrated circuits (ASICs) and a proprietary operating system (OS); and 2) a general-purpose network device 604 that uses common off-the-shelf (COTS) processors and a standard OS.

The special-purpose network device 602 includes networking hardware 610 comprising compute resource(s) 612 (which typically include a set of one or more processors), forwarding resource(s) 614 (which typically include one or more ASICs and/or network processors), and physical network interfaces (NIs) 616 (sometimes called physical ports), as well as non-transitory machine readable storage media 618 having stored therein networking software 620. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 600A-H. During operation, the networking software 620 may be executed by the networking hardware 610 to instantiate a set of one or more networking software instance(s) 622. Each of the networking software instance(s) 622, and that part of the networking hardware 610 that executes that network software instance (be it hardware dedicated to that networking software instance and/or time slices of hardware temporally shared by that networking software instance with others of the networking software instance(s) 622), form a separate virtual network element 630A-R. Each of the virtual network element(s) (VNEs) 630A-R includes a control communication and configuration module 632A-R (sometimes referred to as a local control module or control communication module) and forwarding table(s) 634A-R such that a given virtual network element (e.g., 630A) includes the control communication and configuration module (e.g., 632A), a set of one or more forwarding table(s) (e.g., 634A), and that portion of the networking hardware 610 that executes the virtual network element (e.g., 630A). In some embodiments, the control communication and configuration module 632A encompasses the AoC enforcement module 633A as described herein above.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

The special-purpose network device 602 is often physically and/or logically considered to include: 1) a ND control plane 624 (sometimes referred to as a control plane) comprising the compute resource(s) 612 that execute the control communication and configuration module(s) 632A-R; and 2) a ND forwarding plane 626 (sometimes referred to as a forwarding plane, a data plane, or a media plane) comprising the forwarding resource(s) 614 that utilize the forwarding table(s) (i.e. implemented as match action tables) 634A-R and the physical NIs 616. By way of example, where the ND is a router (or is implementing routing functionality), the ND control plane 624 (the compute resource(s) 612 executing the control communication and configuration module(s) 632A-R) is typically responsible for participating in controlling how data (e.g., packets) are to be routed (e.g., the next hop for the data and the outgoing physical NI for that data) and storing that routing information in the forwarding table(s) 634A-R, and the ND forwarding plane 626 is responsible for receiving that data on the physical NIs 616 and forwarding that data out the appropriate ones of the physical NIs 816 based on the forwarding table(s) 634A-R.

FIG. 6B illustrates an exemplary way to implement the special-purpose network device 602 according to some embodiments of the invention. FIG. 6B shows a special-purpose network device including cards 838 (typically hot pluggable). While in some embodiments the cards 638 are of two types (one or more that operate as the ND forwarding plane 626 (sometimes called line cards), and one or more that operate to implement the ND control plane 624 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec) (RFC 4301 and 4309), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 636 (e.g., a first full mesh coupling the line cards and a second full mesh coupling all of the cards).

Returning to FIG. 6A, the general purpose network device 604 includes hardware 640 comprising a set of one or more processor(s) 642 (which are often COTS processors) and network interface controller(s) 644 (NICs; also known as network interface cards) (which include physical NIs 646), as well as non-transitory machine readable storage media 648 having stored therein software 650. During operation, the processor(s) 642 execute the software 650 to instantiate a hypervisor 654 (sometimes referred to as a virtual machine monitor (VMM)) and one or more virtual machines 662A-R that are run by the hypervisor 654, which are collectively referred to as software instance(s) 652. A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 662A-R, and that part of the hardware 640 that executes that virtual machine (be it hardware dedicated to that virtual machine and/or time slices of hardware temporally shared by that virtual machine with others of the virtual machine(s) 662A-R), forms a separate virtual network element(s) 660A-R. In some embodiments, the virtual machine module 662A encompasses AoC enforcement module 664A.

The virtual network element(s) 660A-R perform similar functionality to the virtual network element(s) 630A-R. For instance, the hypervisor 654 may present a virtual operating platform that appears like networking hardware 610 to virtual machine 662A, and the virtual machine 662A may be used to implement functionality similar to the control communication and configuration module(s) 632A and forwarding table(s) 634A (this virtualization of the hardware 640 is sometimes referred to as network function virtualization (NFV)). Thus, NFV may be used to consolidate many network equipment types onto industry standard high volume server hardware, physical switches, and physical storage, which could be located in Data centers, NDs, and customer premises equipment (CPE). However, different embodiments of the invention may implement one or more of the virtual machine(s) 662A-R differently. For example, while embodiments of the invention are illustrated with each virtual machine 662A-R corresponding to one VNE 660A-R, alternative embodiments may implement this correspondence at a finer level of granularity (e.g., line card virtual machines virtualize line cards, control card virtual machine virtualize control cards, etc.); it should be understood that the techniques described herein with reference to a correspondence of virtual machines to VNEs also apply to embodiments where such a finer level of granularity is used.

In certain embodiments, the hypervisor 654 includes a virtual switch that provides similar forwarding services as a physical Ethernet switch. Specifically, this virtual switch forwards traffic between virtual machines and the NIC(s) 644, as well as optionally between the virtual machines 662A-R; in addition, this virtual switch may enforce network isolation between the VNEs 660A-R that by policy are not permitted to communicate with each other (e.g., by honoring virtual local area networks (VLANs)).

The third exemplary ND implementation in FIG. 6A is a hybrid network device 606, which includes both custom ASICs/proprietary OS and COTS processors/standard OS in a single ND or a single card within an ND. In certain embodiments of such a hybrid network device, a platform VM (i.e., a VM that that implements the functionality of the special-purpose network device 602) could provide for para-virtualization to the networking hardware present in the hybrid network device 606.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 630A-R, VNEs 660A-R, and those in the hybrid network device 606) receives data on the physical NIs (e.g., 616, 646) and forwards that data out the appropriate ones of the physical NIs (e.g., 616, 646). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP) (RFC 768, 2460, 2675, 4113, and 5405), Transmission Control Protocol (TCP) (RFC 793 and 1180), and differentiated services (DSCP) values (RFC 2474, 2475, 2597, 2983, 3086, 3140, 3246, 3247, 3260, 4594, 5865, 3289, 3290, and 3317).

FIG. 6C illustrates various exemplary ways in which VNEs may be coupled according to some embodiments of the invention. FIG. 6C shows VNEs 670A.1-670A.P (and optionally VNEs 670A.Q-670A.R) implemented in ND 600A and VNE 670H.1 in ND 600H. In FIG. 6C, VNEs 670A.1-P are separate from each other in the sense that they can receive packets from outside ND 600A and forward packets outside of ND 600A; VNE 670A.1 is coupled with VNE 670H.1, and thus they communicate packets between their respective NDs; VNE 670A.2-670A.3 may optionally forward packets between themselves without forwarding them outside of the ND 600A; and VNE 670A.P may optionally be the first in a chain of VNEs that includes VNE 670A.Q followed by VNE 670A.R (this is sometimes referred to as dynamic service chaining, where each of the VNEs in the series of VNEs provides a different service—e.g., one or more layer 4-7 network services). While FIG. 6C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 6A, for example, may form part of the Internet or a private network; and other electronic devices (not shown; such as end user devices including workstations, laptops, netbooks, tablets, palm tops, mobile phones, smartphones, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content server or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 6A may also host one or more such servers (e.g., in the case of the general purpose network device 604, one or more of the virtual machines 662A-R may operate as servers; the same would be true for the hybrid network device 606; in the case of the special-purpose network device 602, one or more such servers could also be run on a hypervisor executed by the compute resource(s) 612; in which case the servers are said to be co-located with the VNEs of that ND.

A virtual network is a logical abstraction of a physical network (such as that in FIG. 6A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN RFC 4364) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

FIG. 6D illustrates a network with a single network element on each of the NDs of FIG. 6A, and within this straight forward approach contrasts a traditional distributed approach (commonly used by traditional routers) with a centralized approach for maintaining reachability and forwarding information (also called network control), according to some embodiments of the invention. Specifically, FIG. 6D illustrates network elements (NEs) 670A-H with the same connectivity as the NDs 600A-H of FIG. 6A.

FIG. 6D illustrates that the distributed approach 672 distributes responsibility for generating the reachability and forwarding information across the NEs 670A-H; in other words, the process of neighbor discovery and topology discovery is distributed.

For example, where the special-purpose network device 602 is used, the control communication and configuration module(s) 632A-R of the ND control plane 624 typically include a reachability and forwarding information module to implement one or more routing protocols (e.g., an exterior gateway protocol such as Border Gateway Protocol (BGP) (RFC 4271), Interior Gateway Protocol(s) (IGP) (e.g., Open Shortest Path First (OSPF) (RFC 2328 and 5340), Intermediate System to Intermediate System (IS-IS) (RFC 1142), Routing Information Protocol (RIP) (version 1 RFC 1058, version 2 RFC 2453, and next generation RFC 2080)), Label Distribution Protocol (LDP) (RFC 5036), Resource Reservation Protocol (RSVP) (RFC 2205, 2210, 2211, 2212, as well as RSVP-Traffic Engineering (TE): Extensions to RSVP for LSP Tunnels RFC 3209, Generalized Multi-Protocol Label Switching (GMPLS) Signaling RSVP-TE RFC 3473, RFC 3936, 4495, and 4558)) that communicate with other NEs to exchange routes, and then selects those routes based on one or more routing metrics. Thus, the NEs 670A-H (e.g., the compute resource(s) 612 executing the control communication and configuration module(s) 632A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 624. The ND control plane 624 programs the ND forwarding plane 626 with information (e.g., adjacency and route information) based on the routing structure(s). For example, the ND control plane 624 programs the adjacency and route information into one or more forwarding table(s) 634A-R that are implementations of match action tables (e.g., Forwarding Information Base (FIB), Label Forwarding Information Base (LFIB), and one or more adjacency structures) on the ND forwarding plane 626. For layer 2 forwarding, the ND can store one or more bridging tables that are used to forward data based on the layer 2 information in that data. While the above example uses the special-purpose network device 602, the same distributed approach 672 can be implemented on the general purpose network device 604 and the hybrid network device 606.

FIG. 6D illustrates that a centralized approach 674 (also known as software defined networking (SDN)) that decouples the system that makes decisions about where traffic is sent from the underlying systems that forwards traffic to the selected destination. The illustrated centralized approach 674 has the responsibility for the generation of reachability and forwarding information in a centralized control plane 676 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 676 has a south bound interface 682 with a data plane 680 (sometime referred to the infrastructure layer, network forwarding plane, or forwarding plane (which should not be confused with a ND forwarding plane)) that includes the NEs 670A-H (sometimes referred to as switches, forwarding elements, data plane elements, or nodes). The centralized control plane 676 includes a network controller 678, which includes a centralized reachability and forwarding information module 679 that determines the reachability within the network and distributes the forwarding information to the NEs 670A-H of the data plane 680 over the south bound interface 682 (which may use the OpenFlow protocol). Thus, the network intelligence is centralized in the centralized control plane 676 executing on electronic devices that are typically separate from the NDs.

For example, where the special-purpose network device 602 is used in the data plane 680, each of the control communication and configuration module(s) 632A-R of the ND control plane 624 typically include a control agent that provides the VNE side of the south bound interface 682. In this case, the ND control plane 624 (the compute resource(s) 612 executing the control communication and configuration module(s) 632A-R) performs its responsibility for participating in controlling how data (e.g., packets) is to be routed (e.g., the next hop for the data and the outgoing physical NI for that data) through the control agent communicating with the centralized control plane 676 to receive the forwarding information (and in some cases, the reachability information) from the centralized reachability and forwarding information module 679 (it should be understood that in some embodiments of the invention, the control communication and configuration module(s) 632A-R, in addition to communicating with the centralized control plane 676, may also play some role in determining reachability and/or calculating forwarding information—albeit less so than in the case of a distributed approach; such embodiments are generally considered to fall under the centralized approach 674, but may also be considered a hybrid approach). In some embodiments, the centralized reachability and forwarding module 679 encompasses AoC enforcement functions in AoC enforcement module 681 as described herein above.

While the above example uses the special-purpose network device 602, the same centralized approach 674 can be implemented with the general purpose network device 604 (e.g., each of the VNE 660A-R performs its responsibility for controlling how data (e.g., packets) is to be routed (e.g., the next hop for the data and the outgoing physical NI for that data) by communicating with the centralized control plane 676 to receive the forwarding information (and in some cases, the reachability information) from the centralized reachability and forwarding information module 679; it should be understood that in some embodiments of the invention, the VNEs 660A-R, in addition to communicating with the centralized control plane 676, may also play some role in determining reachability and/or calculating forwarding information—albeit less so than in the case of a distributed approach) and the hybrid network device 606. In fact, the use of SDN techniques can enhance the NFV techniques typically used in the general purpose network device 604 or hybrid network device 606 implementations as NFV is able to support SDN by providing an infrastructure upon which the SDN software can be run, and NFV and SDN both aim to make use of commodity server hardware and physical switches.

FIG. 6D also shows that the centralized control plane 676 has a north bound interface 684 to an application layer 686, in which resides application(s) 688. The centralized control plane 676 has the ability to form virtual networks 692 (sometimes referred to as a logical forwarding plane, network services, or overlay networks (with the NEs 670A-H of the data plane 680 being the underlay network)) for the application(s) 688. Thus, the centralized control plane 676 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The application layer 686 thus enables the execution of applications that manage or interact with the functions associated with the network elements, this can include the implementation of the AoC purchase function module 687 that implements the functions of a discrete AoC server or the AoC purchase functions that would be executed by such a device. The AoC purchase function module 687 can interact with the AoC enforcement module 681 using the centralized approach to configure and administer AoC in a CCN network implemented in this manner.

While FIG. 6D shows the distributed approach 672 separate from the centralized approach 674, the effort of network control may be distributed differently or the two combined in certain embodiments of the invention. For example: 1) embodiments may generally use the centralized approach (SDN) 674, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 674, but may also be considered a hybrid approach.

While FIG. 6D illustrates the simple case where each of the NDs 600A-H implements a single NE 670A-H, it should be understood that the network control approaches described with reference to FIG. 6D also work for networks where one or more of the NDs 600A-H implement multiple VNEs (e.g., VNEs 630A-R, VNEs 660A-R, those in the hybrid network device 606). Alternatively or in addition, the network controller 678 may also emulate the implementation of multiple VNEs in a single ND. Specifically, instead of (or in addition to) implementing multiple VNEs in a single ND, the network controller 678 may present the implementation of a VNE/NE in a single ND as multiple VNEs in the virtual networks 692 (all in the same one of the virtual network(s) 692, each in different ones of the virtual network(s) 692, or some combination). For example, the network controller 678 may cause an ND to implement a single VNE (a NE) in the underlay network, and then logically divide up the resources of that NE within the centralized control plane 676 to present different VNEs in the virtual network(s) 692 (where these different VNEs in the overlay networks are sharing the resources of the single VNE/NE implementation on the ND in the underlay network).

On the other hand, FIGS. 6E and 6F respectively illustrate exemplary abstractions of NEs and VNEs that the network controller 678 may present as part of different ones of the virtual networks 692. FIG. 6E illustrates the simple case of where each of the NDs 600A-H implements a single NE 670A-H (see FIG. 6D), but the centralized control plane 676 has abstracted multiple of the NEs in different NDs (the NEs 670A-C and G-H) into (to represent) a single NE 6701 in one of the virtual network(s) 692 of FIG. 6D, according to some embodiments of the invention. FIG. 6E shows that in this virtual network, the NE 6701 is coupled to NE 670D and 670F, which are both still coupled to NE 670E.

FIG. 6F illustrates a case where multiple VNEs (VNE 670A.1 and VNE 670H.1) are implemented on different NDs (ND 600A and ND 600H) and are coupled to each other, and where the centralized control plane 676 has abstracted these multiple VNEs such that they appear as a single VNE 670T within one of the virtual networks 692 of FIG. 6D, according to some embodiments of the invention. Thus, the abstraction of a NE or VNE can span multiple NDs.

While some embodiments of the invention implement the centralized control plane 676 as a single entity (e.g., a single instance of software running on a single electronic device), alternative embodiments may spread the functionality across multiple entities for redundancy and/or scalability purposes (e.g., multiple instances of software running on different electronic devices).

Figure 7:
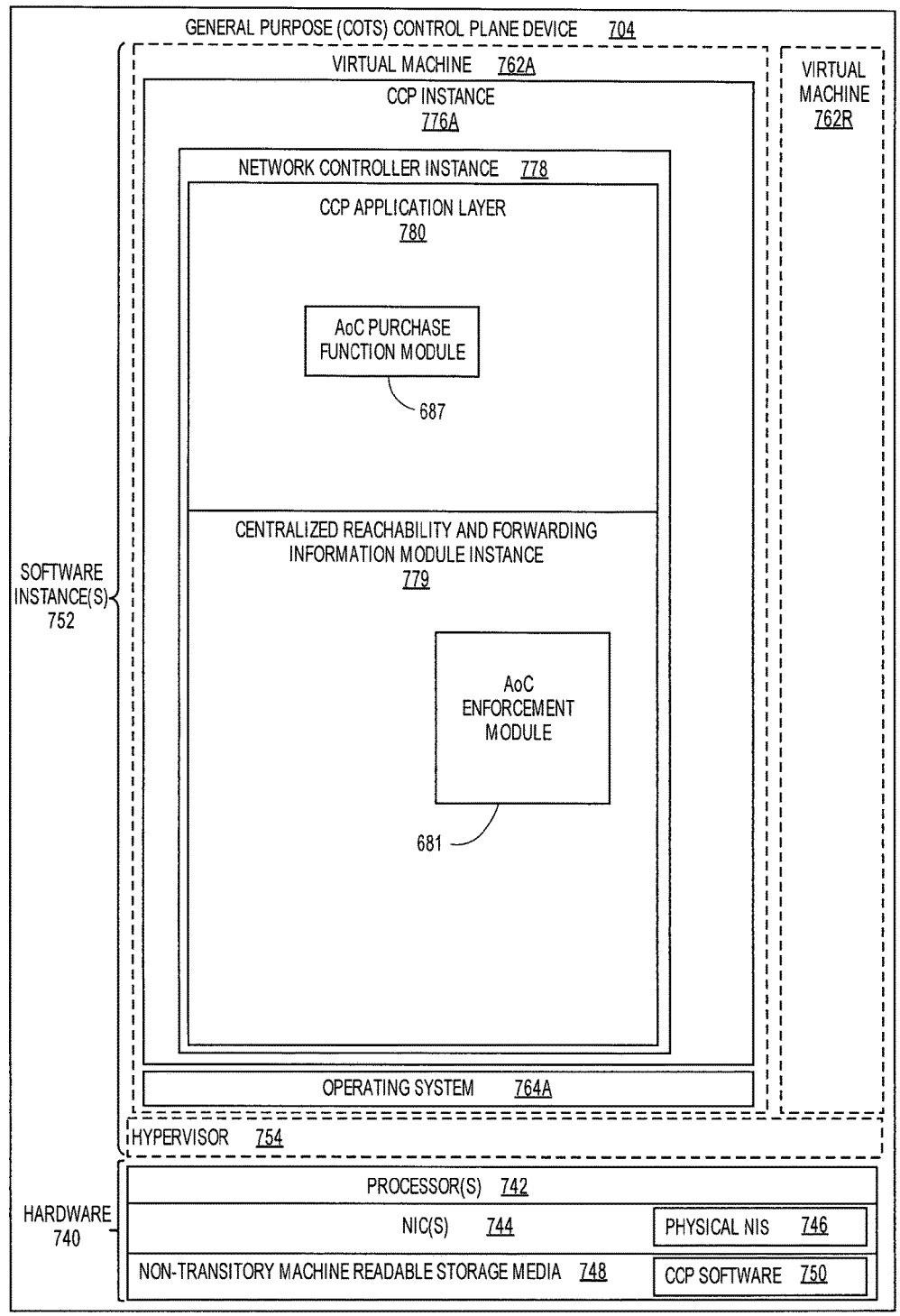
FIG. 7 illustrates a general purpose control plane device including hardware comprising a set of one or more processor(s) (which are often Commercial off-the-shelf (COTS) processors) and network interface controller(s) (NICs; also known as network interface cards) (which include physical NIs), as well as non-transitory machine readable storage media having stored therein centralized control plane (CCP) software), according to some embodiments of the invention.

Similar to the network device implementations, the electronic device(s) running the centralized control plane 676, and thus the network controller 678 including the centralized reachability and forwarding information module 679, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 7 illustrates, a general purpose control plane device 704 including hardware 740 comprising a set of one or more processor(s) 742 (which are often COTS processors) and network interface controller(s) 744 (NICs; also known as network interface cards) (which include physical NIs 746), as well as non-transitory machine readable storage media 748 having stored therein centralized control plane (CCP) software 750.

In embodiments that use compute virtualization, the processor(s) 742 typically execute software to instantiate a hypervisor 754 (sometimes referred to as a virtual machine monitor (VMM)) and one or more virtual machines 762A-R that are run by the hypervisor 754; which are collectively referred to as software instance(s) 752. A virtual machine is a software implementation of a physical machine that runs programs as if they were executing on a physical, non-virtualized machine; and applications generally are not aware they are running on a virtual machine as opposed to running on a "bare metal" host electronic device, though some systems provide para-virtualization which allows an operating system or application to be aware of the presence of virtualization for optimization purposes. Again, in embodiments where compute virtualization is used, during operation an instance of the CCP software 750 (illustrated as CCP instance 776A) on top of an operating system 764A are typically executed within the virtual machine 762A. In embodiments where compute virtualization is not used, the CCP instance 776A on top of operating system 764A is executed on the "bare metal" general purpose control plane device 704.

The operating system 764A provides basic processing, input/output (I/O), and networking capabilities. In some embodiments, the CCP instance 776A includes a network controller instance 778. The network controller instance 778 includes a centralized reachability and forwarding information module instance 779 (which is a middleware layer providing the context of the network controller 778 to the operating system 764A and communicating with the various NEs), and an CCP application layer 780 (sometimes referred to as an application layer) over the middleware layer (providing the intelligence required for various network operations such as protocols, network situational awareness, and user—interfaces). At a more abstract level, this CCP application layer 780 within the centralized control plane 776 works with virtual network view(s) (logical view(s) of the network) and the middleware layer provides the conversion from the virtual networks to the physical view. The CCP application can encompass the functionality of the AoC enforcement module 781 as described herein above. Similarly, the CCP application layer 780 can implement the AoC function module 687 in addition to the other applications 688.

The centralized control plane 776 transmits relevant messages to the data plane 680 based on CCP application layer 780 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 680 may receive different messages, and thus different forwarding information. The data plane 680 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

Those skilled in the art will appreciate that the use of the term "exemplary" is used herein to mean "illustrative," or "serving as an example," and is not intended to imply that a particular embodiment is preferred over another or that a particular feature is essential. Likewise, the terms "first" and "second," and similar terms, are used simply to distinguish one particular instance of an item or feature from another, and do not indicate a particular order or arrangement, unless the context clearly indicates otherwise. Further, the term "step," as used herein, is meant to be synonymous with "operation" or "action." Any description herein of a sequence of steps does not imply that these operations must be carried out in a particular order, or even that these operations are carried out in any order at all, unless the context or the details of the described operation clearly indicates otherwise.

Of course, the present invention may be carried out in other specific ways than those herein set forth without departing from the scope and essential characteristics of the invention. One or more of the specific processes discussed above may be carried out using one or more appropriately configured processing circuits. In some embodiments, these processing circuits may comprise one or more microprocessors, microcontrollers, and/or digital signal processors programmed with appropriate software and/or firmware to carry out one or more of the operations described above, or variants thereof. In some embodiments, these processing circuits may comprise customized hardware to carry out one or more of the functions described above. The present embodiments are, therefore, to be considered in all respects as illustrative and not restrictive.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

The invention claimed is:

1. A method for executing advice of charge (AoC) enforcement in a computing device implementing a content centric networking (CCN) gateway, where the CCN gateway is part of a CCN network, the method comprising the steps of:
   receiving a CCN interest packet from a user equipment in a network external to the CCN network, the CCN interest packet including a CCN name;
   looking up a prefix of the CCN name in an AoC table;
   in response to determining a match between the prefix of the CCN name and an entry in the AoC table, generating an AoC request and forwarding the AoC request toward an AoC server identified by the entry in the AoC table determined to be the match with the prefix of the CCN name; and
   in response to not determining the match between the prefix of the CCN name and the entry in the AoC table or in response to receiving a purchase accepted response from the AoC server, retrieving a CCN object identified by the CCN name and forwarding the CCN object to the user equipment in the network external to the CCN network from which the CCN interest packet was received.

2. The method of claim 1, further comprising the step of:
   in response to determining the match between the prefix of the CCN name and the entry of the AoC table, looking up the prefix of the CCN name in an accepted content table (ACT).

3. The method of claim 2, wherein generating the AoC request and forwarding the AoC request toward the AoC server is further in response to not determining a match between the prefix of the CCN name and an entry in the ACT.

4. The method of claim 2, wherein retrieving the CCN object identified by the CCN name and forwarding the CCN object to the user equipment in the network external to the CCN network is further in response to determining a match between the prefix of the CCN name and an entry in the ACT.

5. The method of claim 1, further comprising the step of:
   in response to receiving a purchase denied response from the AoC server, discarding the CCN interest packet.

6. The method of claim 1, further comprising the step of:
   storing the CCN interest until a response is received from the AoC server.

7. The method of claim 1, further comprising the step of:
   adding an entry in the ACT for a user and a domain identified in the received purchase accepted response.

8. A network device to implement a method for executing advice of charge (AoC) enforcement, the network device implementing a content centric networking (CCN) gateway, where the CCN gateway is part of a CCN network, the network device comprising:
   a non-transitory computer-readable medium having stored therein an AoC enforcement module; and
   a processor coupled to the non-transitory computer-readable medium, the processor configured to execute the AoC enforcement module, the AoC enforcement module configured to receive a CCN interest packet from a user equipment in a network external to the CCN network, the CCN interest packet including a CCN name, to look up a prefix of the CCN name in an AoC table, in response to determining a match between the prefix of the CCN name and an entry in the AoC table, to generate an AoC request and to forward the AoC request toward an AoC server identified by the entry in the AoC table determined to be the match with the prefix of the CCN name, and in response to not determining the match between the prefix of the CCN name and the entry in the AoC table or in response to receiving a purchase accepted response from the AoC server, to retrieve a CCN object identified by the CCN name and to forward the CCN object to the user equipment in the network external to the CCN network from which the CCN interest packet was received.

9. The network device of claim 8, wherein the AoC enforcement module is further configured in response to determining the match between the prefix of the CCN name and the entry of the AoC table, to look up the prefix of the CCN name in an accepted content table (ACT).

10. The network device of claim 9, wherein generating the AoC request and forwarding the AoC request toward the AoC server by the AoC enforcement module is further in response to not determining a match between the prefix of the CCN name and an entry in the ACT.

11. The network device of claim 9, wherein retrieving the CCN object identified by the CCN name and forwarding the CCN object to the user equipment in the network external to the CCN network by the AoC enforcement module is further in response to determining a match between the prefix of the CCN name and an entry in the ACT.

12. The network device of claim 8, wherein the AoC enforcement module is further configured in response to receiving a purchase denied response from the AoC server, to discard the CCN interest packet.

13. The network device of claim 8, wherein the AoC enforcement module is further configured to store the CCN interest until a response is received from the AoC server.

14. The network device of claim 8, wherein the AoC enforcement module is further configured to add an entry in the ACT for a user and a domain identified in the received purchase accepted response.

15. A method for performing advice of charge (AoC) purchase functions in a computing device implementing an AoC server in a content centric networking (CCN) network, the method comprising the steps of:
   receiving an AoC request from an AoC CCN gateway in the CCN network, where the AoC request includes a name of a CCN object and a unique user identifier;
   generating an AoC purchase request and sending the AoC purchase request to a user equipment associated with the unique user identifier; and generating a purchase accepted response to be sent to the AoC CCN gateway, in response to receiving a purchase approval from the user equipment.

16. The method of claim 15, further comprising the step of:
    determining whether a transaction database includes an entry for a prior purchase associated with the unique user identifier.

17. The method of claim 15, further comprising the step of:
    storing a transaction entry in a transaction database, in response to receiving the purchase approval from the user equipment associated with the unique user identifier.

18. The method of claim 15, further comprising the step of:
    generating a purchase denied response to be sent to the AoC CCN gateway, in response to receiving a purchase denied from the unique user identifier.

19. The method of claim 18, wherein the received purchase approval or purchase denied identifies the name of the CCN object.

20. A computing device to implement a method for executing advice of charge (AoC) purchase functions, wherein the computing device implements an AoC server in a content centric networking (CCN) network, the computing device comprising:
    a non-transitory machine-readable storage medium having stored therein an AoC purchase function module; and
    a processor communicatively coupled to the non-transitory machine-readable storage medium, the processor configured to execute the AoC purchase function module, the AoC purchase function module configured to receive an AoC request from an AoC CCN gateway in the CCN network, where the AoC request includes a name of a CCN object and a unique user identifier, to generate an AoC purchase request and to send the AoC purchase request to a user equipment associated with the unique user identifier, and to generate a purchase accepted response to be sent to the AoC CCN gateway, in response to receiving a purchase approval from the user equipment.

21. The computing device of claim 20, wherein the AoC purchase function module is further configured to determine whether a transaction database includes an entry for a prior purchase associated with the unique user identifier.

22. The computing device of claim 20, wherein the AoC purchase function module is further configured to store a transaction entry in the transaction database, in response to receiving the purchase approval from the user equipment associated with the unique user identifier.

23. The computing device of claim 20, wherein the AoC purchase function module is further configured to generate a purchase denied response to be sent to the AoC CCN gateway, in response to receiving a purchase denied from the unique user identifier.

24. The computing device of claim 23, wherein the received purchase approval or purchase denied identifies the name of the CCN object.

* * * * *